US012715687B2

(12) United States Patent
Stokowski

(10) Patent No.: US 12,715,687 B2
(45) Date of Patent: Aug. 25, 2026

(54) DYNAMIC STORAGE SYSTEM AND METHODS THEREOF

(71) Applicant: Nerv Industries Ltd., Rocky View County (CA)

(72) Inventor: David John Stokowski, Rocky View County (CA)

(73) Assignee: Nerv Industries Ltd., Rocky View County (CA)

( * ) Notice: Subject to any disclaimer, the term of this patent is extended or adjusted under 35 U.S.C. 154(b) by 686 days.

(21) Appl. No.: 18/021,524

(22) PCT Filed: Aug. 19, 2021

(86) PCT No.: PCT/CA2021/051154
§ 371 (c)(1),
(2) Date: Feb. 15, 2023

(87) PCT Pub. No.: WO2022/036456
PCT Pub. Date: Feb. 24, 2022

(65) Prior Publication Data

US 2024/0017920 A1 Jan. 18, 2024

Related U.S. Application Data

(60) Provisional application No. 63/067,541, filed on Aug. 19, 2020.

(51) Int. Cl.
*B65G 1/10* (2006.01)
*B65G 1/04* (2006.01)
(Continued)

(52) U.S. Cl.
CPC ........... *B65G 1/0464* (2013.01); *B65G 1/065* (2013.01); *B66C 15/02* (2013.01); *B66C 17/06* (2013.01)

(58) Field of Classification Search
CPC ........................................................ B65G 1/10
See application file for complete search history.

(56) References Cited

U.S. PATENT DOCUMENTS 5,333,983 A * 8/1994 Hatouchi ............... A47B 53/02
700/214
8,628,289 B1 1/2014 Benedict et al.
(Continued)

FOREIGN PATENT DOCUMENTS

DE 19813291 A1 10/1999
EP 3336025 A1 6/2018
(Continued)

OTHER PUBLICATIONS

JP171712 Machine Translation from espacenet. (Year: 1994).*
(Continued)

*Primary Examiner* — Mark C Hageman
(74) *Attorney, Agent, or Firm* — Troutman Pepper Locke LLP

(57) ABSTRACT

Systems and methods are provided relating to a storage and retrieval system for selectively storing and accessing loads. The storage system having a dynamic structure of storage cells located in one or more of shelves. Shelves in the system are independently moveably attached to a structure of the system. The system also includes a crane arranged to move horizontally with an integrated transfer device, arranged to convey a stored load in a horizontal direction and then lift in a vertical direction. Methods of accessing a load in the system and storing a load in the system are also provided.

20 Claims, 30 Drawing Sheets

(51) Int. Cl.

| | |
|---|---|
| ***B65G 1/06*** | (2006.01) |
| ***B66C 15/02*** | (2006.01) |
| ***B66C 17/06*** | (2006.01) |

(56) References Cited

U.S. PATENT DOCUMENTS

| | | | | |
|---|---|---|---|---|
| 10,745,199 | B2 * | 8/2020 | Chang .................. | B65G 1/0407 |
| 2008/0075569 | A1 | 3/2008 | Benedict et al. | |
| 2016/0272421 | A1 | 9/2016 | Hognaland | |

FOREIGN PATENT DOCUMENTS

| | | | |
|---|---|---|---|
| JP | S563205 | A | 1/1981 |
| JP | H06171712 | A | 6/1994 |
| JP | 2000152833 | A | 6/2000 |
| JP | 2000203703 | A | 7/2000 |
| JP | 2017178459 | A | 10/2017 |
| WO | 2018/192630 | A2 | 10/2018 |

OTHER PUBLICATIONS

JP2017178459 Machine translation from espacenet. (Year: 2017).*
JP200203703 machine translation from espacenet. (Year: 2000).*
JPS563205 Machine translation from espacenet. (Year: 1981).*
DE19813291 Machine translation from espacenet. (Year: 1999).*
International Search Report and Written Opinion for PCT Application No. PCT/CA2021/051154 Dated Nov. 29, 2021.
Supplementary European Search report for EU Application EP 21857091 completed Jul. 10, 2024.

* cited by examiner

DYNAMIC STORAGE SYSTEM AND METHODS THEREOF

FIELD

Embodiments relate to the field of logistics and storage systems. Specifically, embodiments herein relate to storage systems comprising a dynamic substructure of storage cells and transport vehicles and related methods.

BACKGROUND

An automated dynamic storage system is a product transfer, storage and retrieval system. An automated dynamic storage system generally includes a dynamic three dimensional storage structure defining a volume containing storage cells that are placed in discrete locations independent of other storage cells. The storage structure may be constructed from vertical uprights and horizontal beams that can be from metal, composite or plastic depending on product load mass and overall structure and can be field adjustable or fixed as required by the application. An automated dynamic storage system generally includes a moving vehicle or crane of which there can be one or more depending on the application to retrieve and transfer loads.

In US Patent Application Publication No. 2016/0272421 to Hognaland (Hognaland), a storage system is disclosed having one or more grid structures and one or more vehicles movable at the top level of each grid structure. In Hognaland, storage bins arranged in vertical stacks with storage bins located at the top of grid structures being directly accessible. Storage bins located in a vertical stack other than at the top position may require moving other storage bins to gain access to the targeted storage bin. In embodiments, the system in Hognaland may have a consolidation grid structure for intermediate storing.

In U.S. Pat. No. 8,628,289 to Benedict et al. (Benedict), a material handling and storage system includes pallet carrying elevators movable both vertically and horizontally, as well as an array of generally parallel rows of vertical stacks or columns of storage bins arranged in parallel rows with aisles between. In Benedict, the elevators are suspended from carriers and are raised and lowered from the carriers to retrieve and transfer storage bins.

SUMMARY

Provided herein is a storage system having a dynamic structure of storage cells located in one or more of shelves. In embodiments, shelves are independently moveably attached to a frame structure of the system, providing support and stability for the shelves, improving time efficiencies as multiple shelves can be moved simultaneously and requiring less empty space reserved for corridors. In embodiments, the system further includes a crane arranged to move horizontally with an integrated transfer device, arranged to convey a stored load in a horizontal direction and then lift in a vertical direction. In embodiments, the crane is supported directly by the frame structure of the storage system and not suspended therefrom during load/unloading as well as during movement along the top of the structure.

In a broad aspect, a storage and retrieval system for selectively storing and accessing loads includes a frame structure, at least one shelf, at least one drive mechanism and a crane. The frame structure has a top, a bottom, a first side, a second side opposite the first side, a third side and a fourth side opposite the third side wherein the third side is adjacent the first side and the second side. The at least one shelf is positioned within the frame structure. The at least one shelf includes a plurality of storage cells on a first shelf side of the at least one shelf, wherein the at least one shelf is moveably attached to the frame structure and is moveable along a first horizontal axis. The at least one drive mechanism is attached to the at least one shelf, the at least one drive mechanism configured to move the at least one shelf. The crane adapted to move horizontally over the frame and comprising a crane platform configured to move vertically and adapted to transfer loads between the crane platform and the plurality of storage cells.

In an embodiment, the at least one drive mechanism includes at least a top drive mechanism located proximate the top and a bottom drive mechanism located proximate the bottom.

In an embodiment, the top drive mechanism and the bottom drive mechanism are mechanically linked.

In an embodiment, the at least one shelf further includes a second plurality of storage cells on a second shelf side.

In an embodiment, the at least one shelf includes two or more shelves.

In an embodiment, the at least one shelf is moveably attached to the frame structure via shelf rolling elements located at least proximate the top and the bottom of the frame structure.

In an embodiment, the system further includes a first end shelf attached to the frame structure at the first side and comprising a plurality of first end storage cells, and a second end shelf attached to the frame structure at the second side and comprising a plurality of second end storage cells.

In an embodiment, the system further includes a plurality of rails supported by the frame structure and running horizontally at the top of the frame structure, a crane chassis moveably attached to two or more of the plurality of rails, the crane chassis comprising a crane chassis drive mechanism to move the crane chassis along the plurality of rails, and the crane moveably attached to the crane chassis, the crane configured to move horizontally along the crane chassis. The crane includes a crane drive mechanism to move the crane horizontally along the crane chassis, a crane platform, and a crane elevator drive mechanism to move the crane platform vertically relative to the crane.

In an embodiment, the at least one shelf further includes one or more tracks running from the top to the bottom and the crane platform includes one or more alignment elements adapted to engage the one or more tracks to limit non-vertical movement of the crane platform.

In an embodiment, the crane platform further includes emergency crane platform locking elements configured to engage with the at least one shelf to lock the crane platform to the at least one shelf in the event of a failure of the crane elevator drive mechanism.

In an embodiment, the crane chassis further includes crane chassis locking elements configured to engage with the frame structure to lock the crane chassis to the frame structure.

In an embodiment, the crane further includes crane locking elements configured to engage with the crane chassis to lock the crane to the crane chassis In an embodiment, one of the crane and the crane platform further includes seated crane platform locking elements that engage between the crane and crane platform to lock the crane platform to the crane during movement of the crane.

In an embodiment, the crane platform further includes loading crane platform locking elements that engage with the at least one shelf to lock the crane platform to the at least one shelf during the transfer of loads between the crane platform and storage cells.

In an embodiment, the crane platform defines two or more chambers, each chamber includes a plurality of platform rollers, and a bottom slider configured to be extendable away from the crane platform and comprising a plurality of bottom slider rollers wherein the platform rollers and bottom slider rollers are actuatable between a lowered position and a raised position.

In an embodiment, the crane platform further includes a retrieval mechanism adapted to extend from crane platform to engage a feature on the loads for transferring pulling the loads between the crane platform and storage cells.

In another broad aspect, a method of accessing a load in a storage and retrieval system includes laterally moving storage shelves to create a corridor with access to a target load, moving a crane located above the storage shelves to a horizontal position directly above the corridor, lowering a crane platform from the crane to a vertical position adjacent the target load, transferring the target load to the crane platform, and raising the crane platform into the crane.

In an embodiment, the step of lowering a crane platform from the crane to a vertical position adjacent the target load further includes locking the crane platform to one or more of the storage shelves, and the step of transferring the target load to the crane platform further includes unlocking the crane platform from the one or more of the storage shelves after the load has been transferred to the crane platform.

In another broad aspect, a method of storing a load in a storage and retrieval system includes laterally moving storage shelves to create a corridor with access to a target storage cell, moving a crane located above the storage shelves, the crane comprising a crane platform having the load thereon to a horizontal position directly above the corridor, lowering the crane platform from the crane to a vertical position adjacent the target location, and transferring the load from the crane platform to the target storage cell.

In an embodiment, the step of lowering the crane platform from the crane to a vertical position adjacent the target storage cell further includes locking the crane platform to one or more of the storage shelves, the step of transferring the load from the crane platform to the target storage cell further includes unlocking the crane platform from the one or more of the storage shelves after the load has been transferred to the target storage cell, and the method further includes the step of raising the crane platform into the crane.

In an embodiment, moving the crane includes moving a crane chassis along a first horizontal axis and moving the crane moveable within the crane chassis along a second horizontal axis perpendicular to the first horizontal axis.

Figure 1:
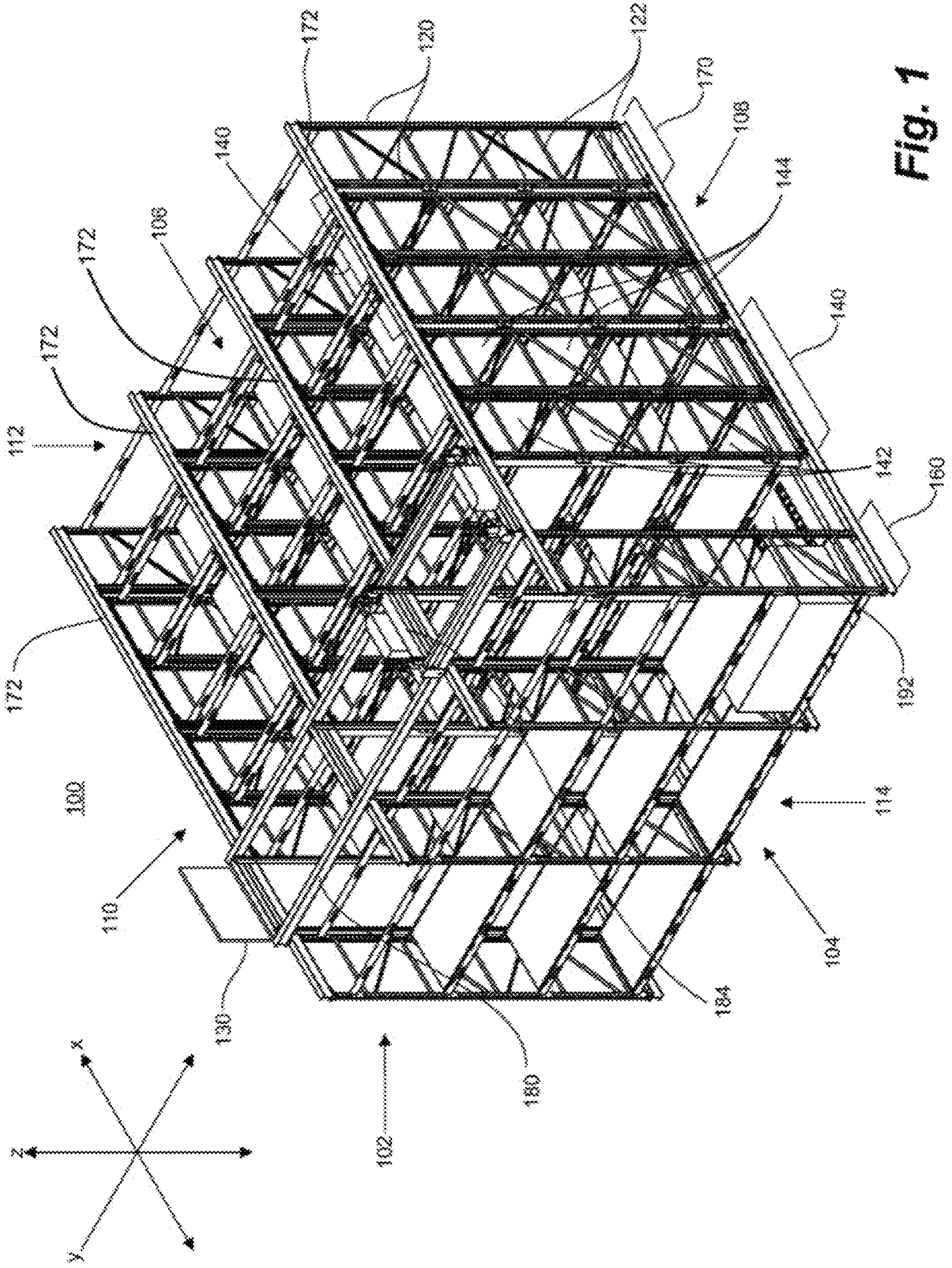
FIG. 1 is a an isometric view of an embodiment of an automated dynamic storage system.
Figure 3:
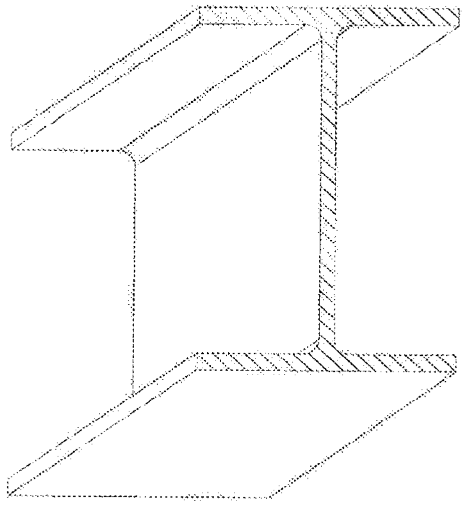
Figure 4:
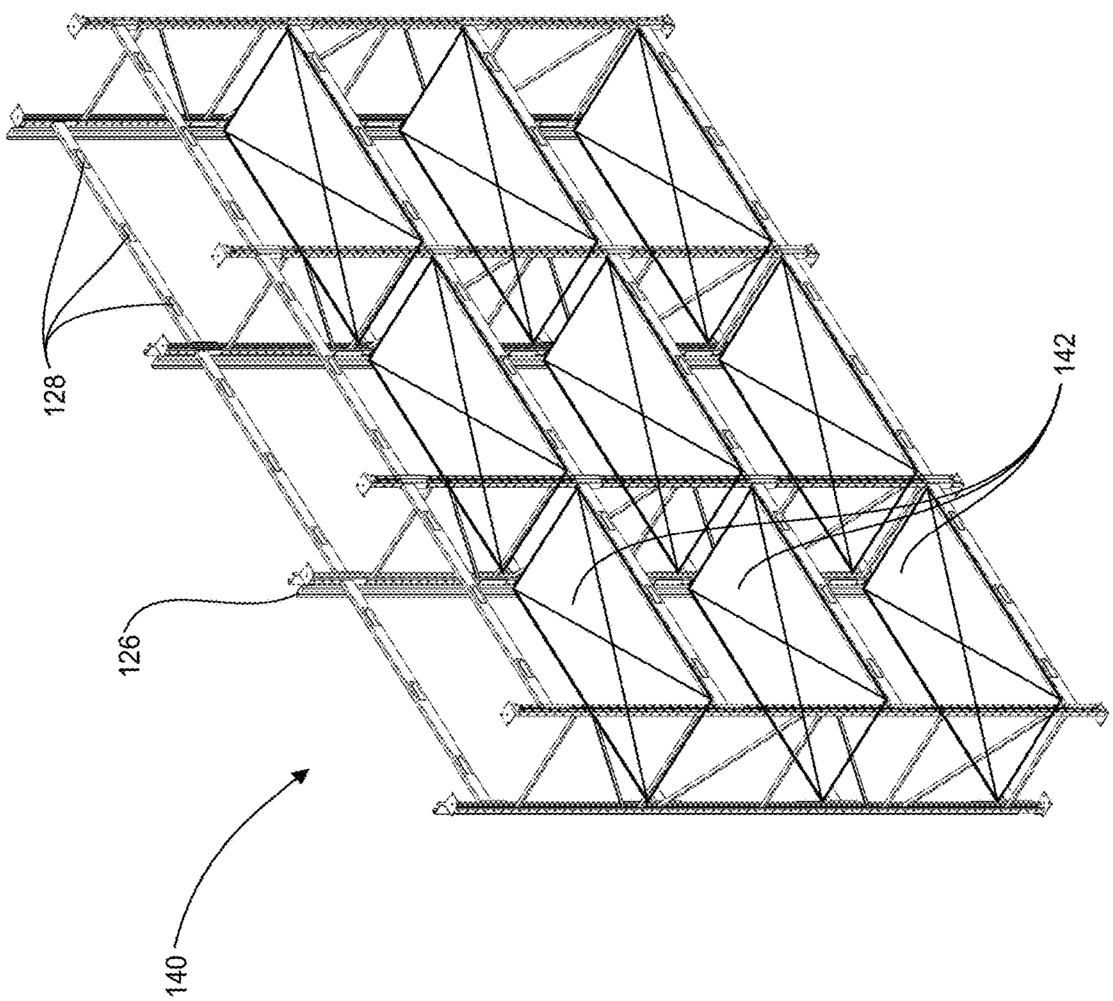
Figure 5:
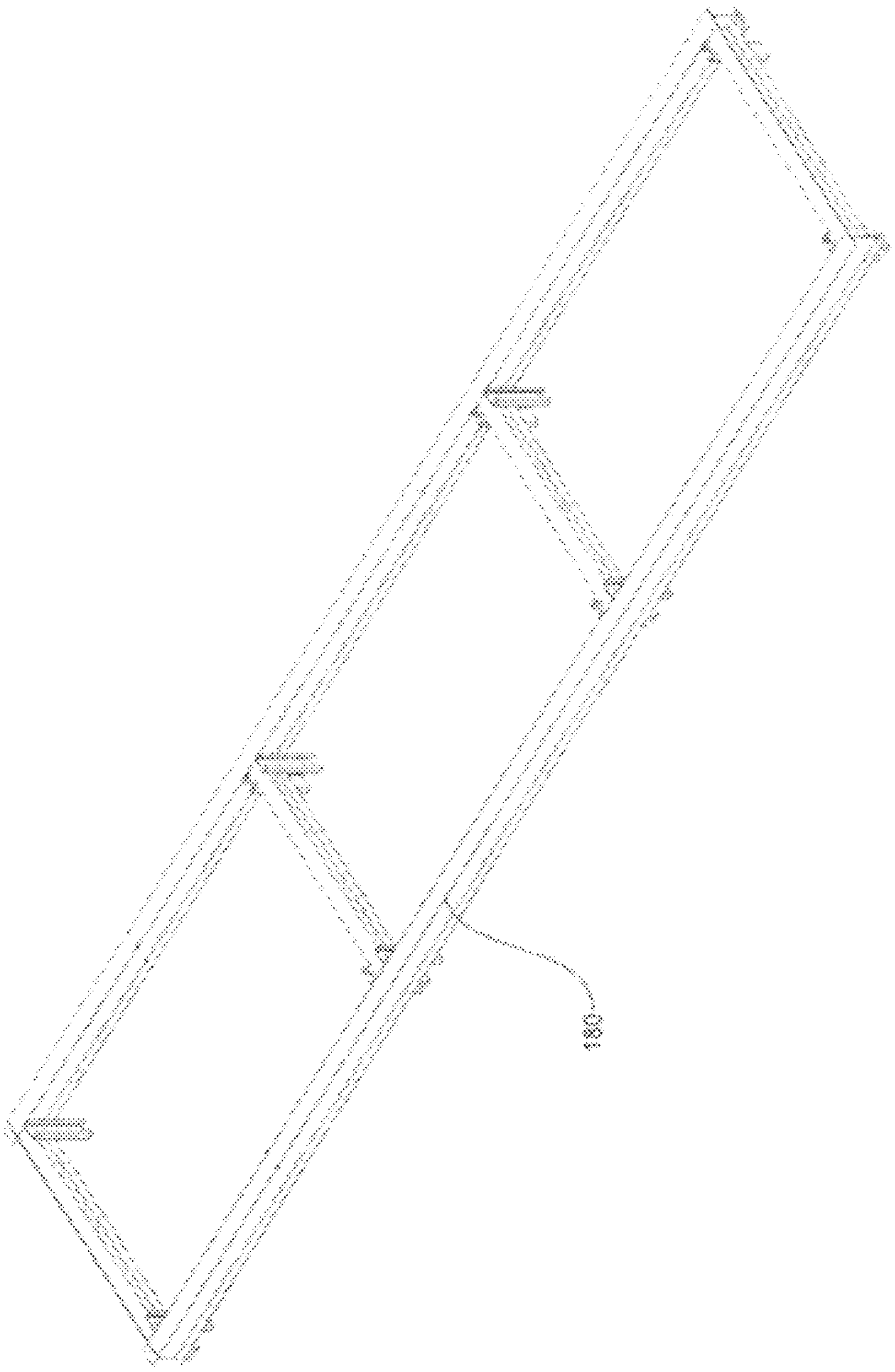
Figure 6:
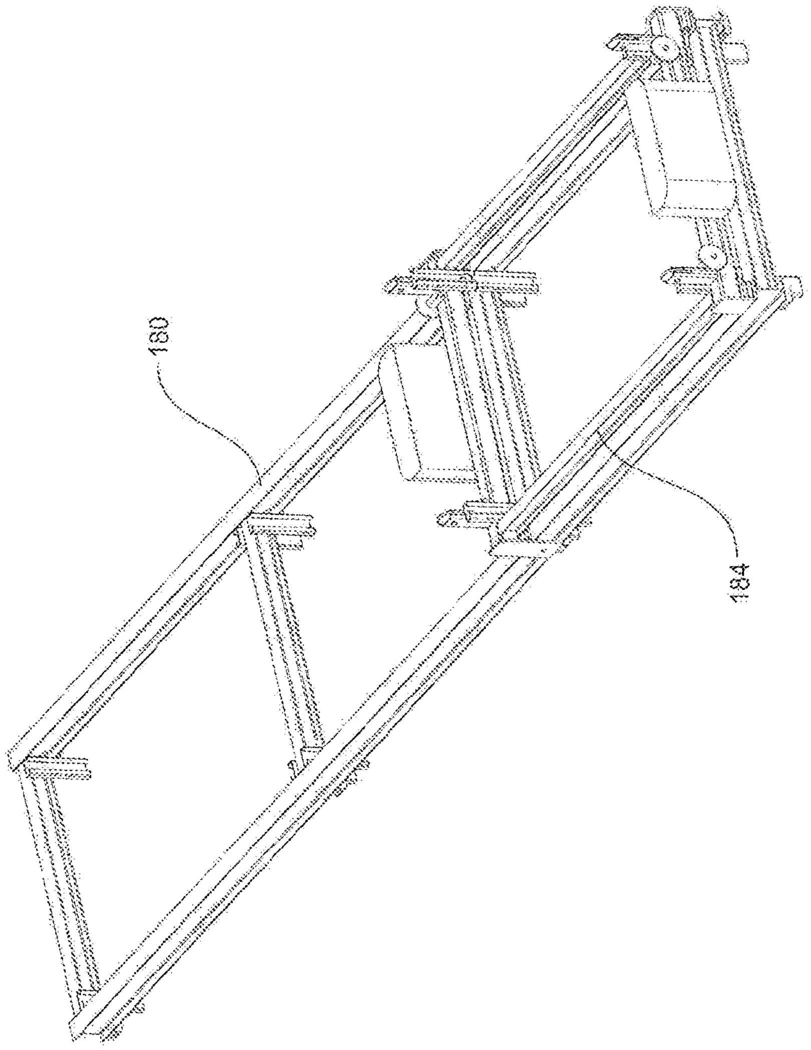
Figure 7:
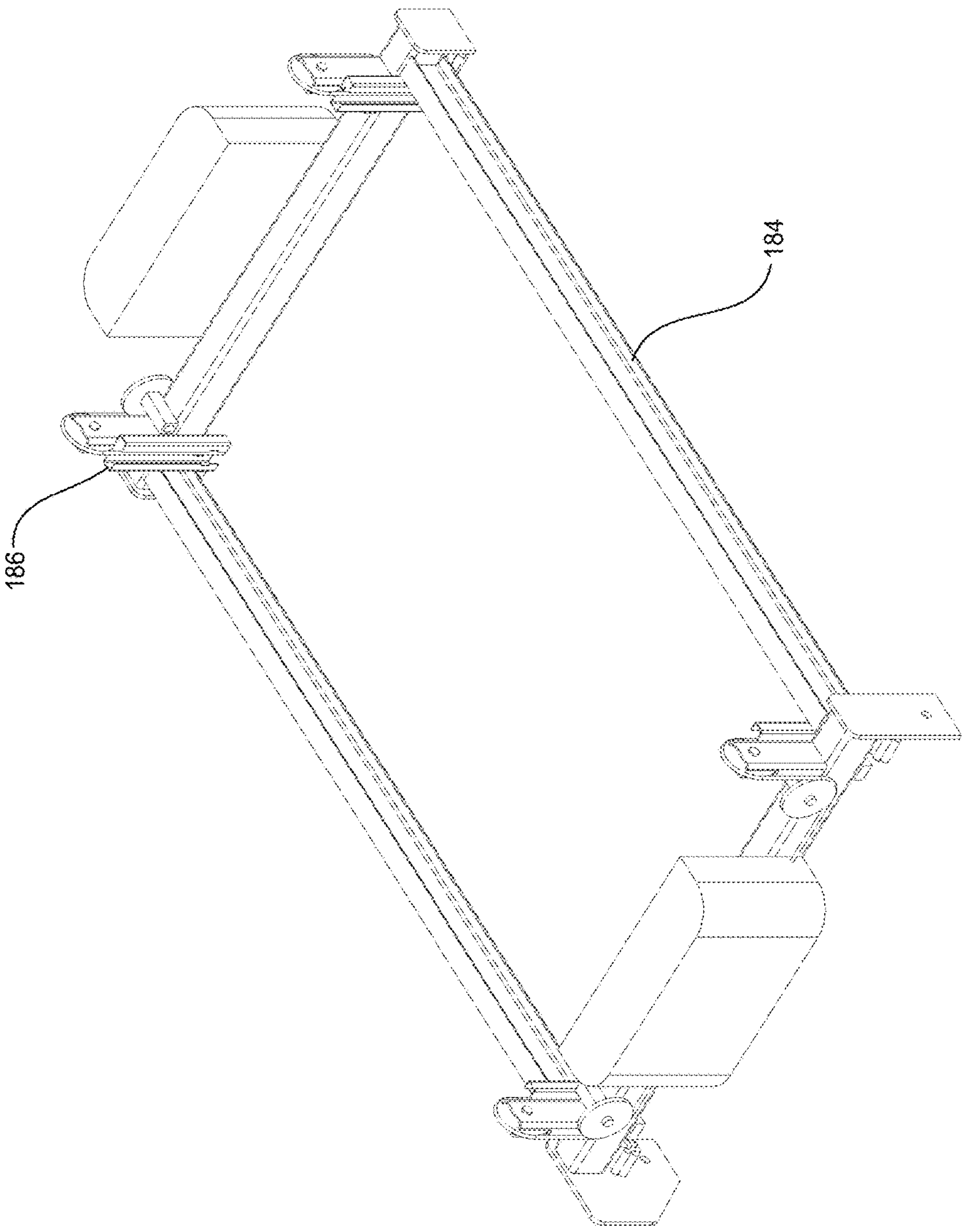
Figure 8A:
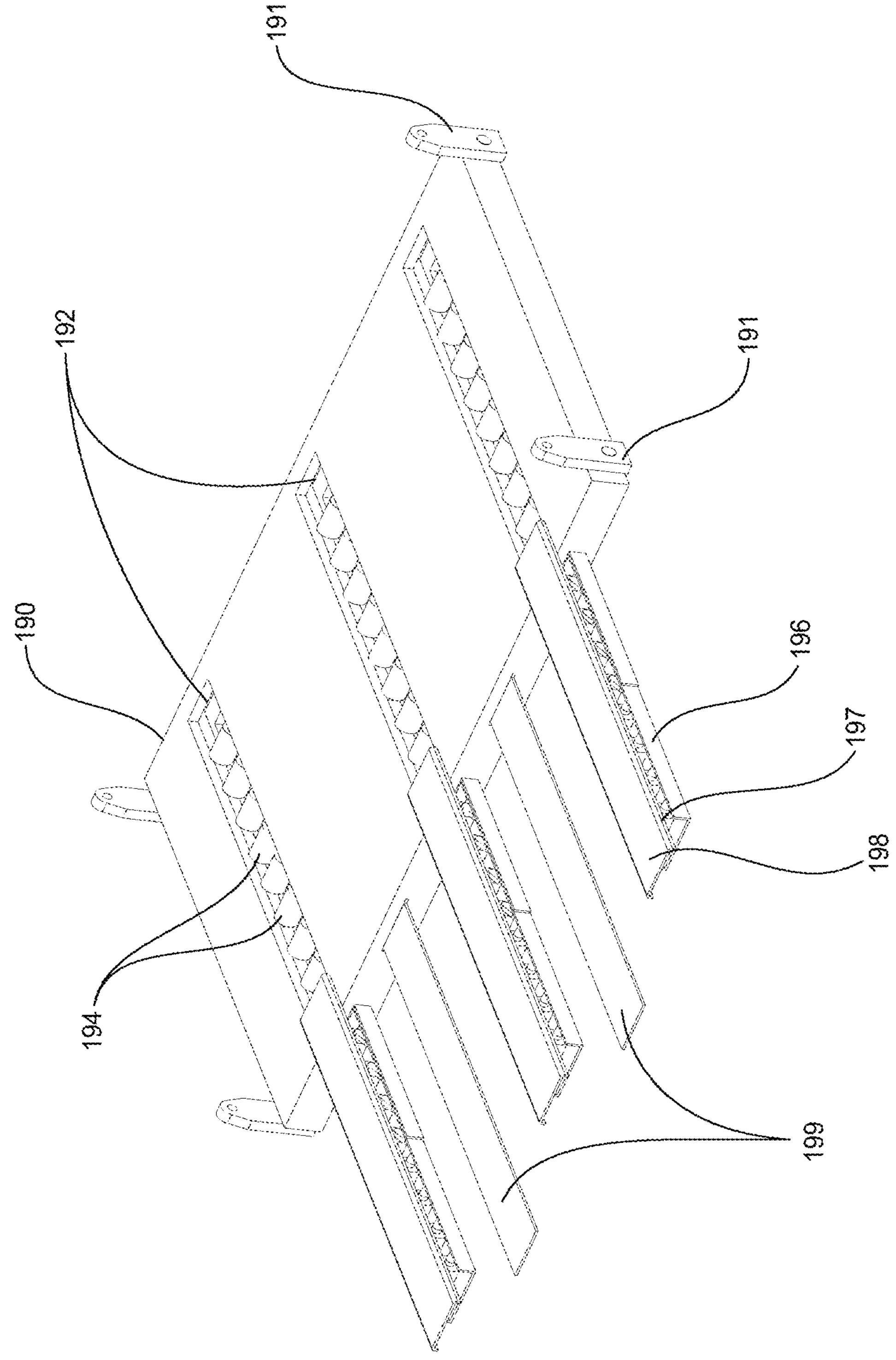
Figure 8B:
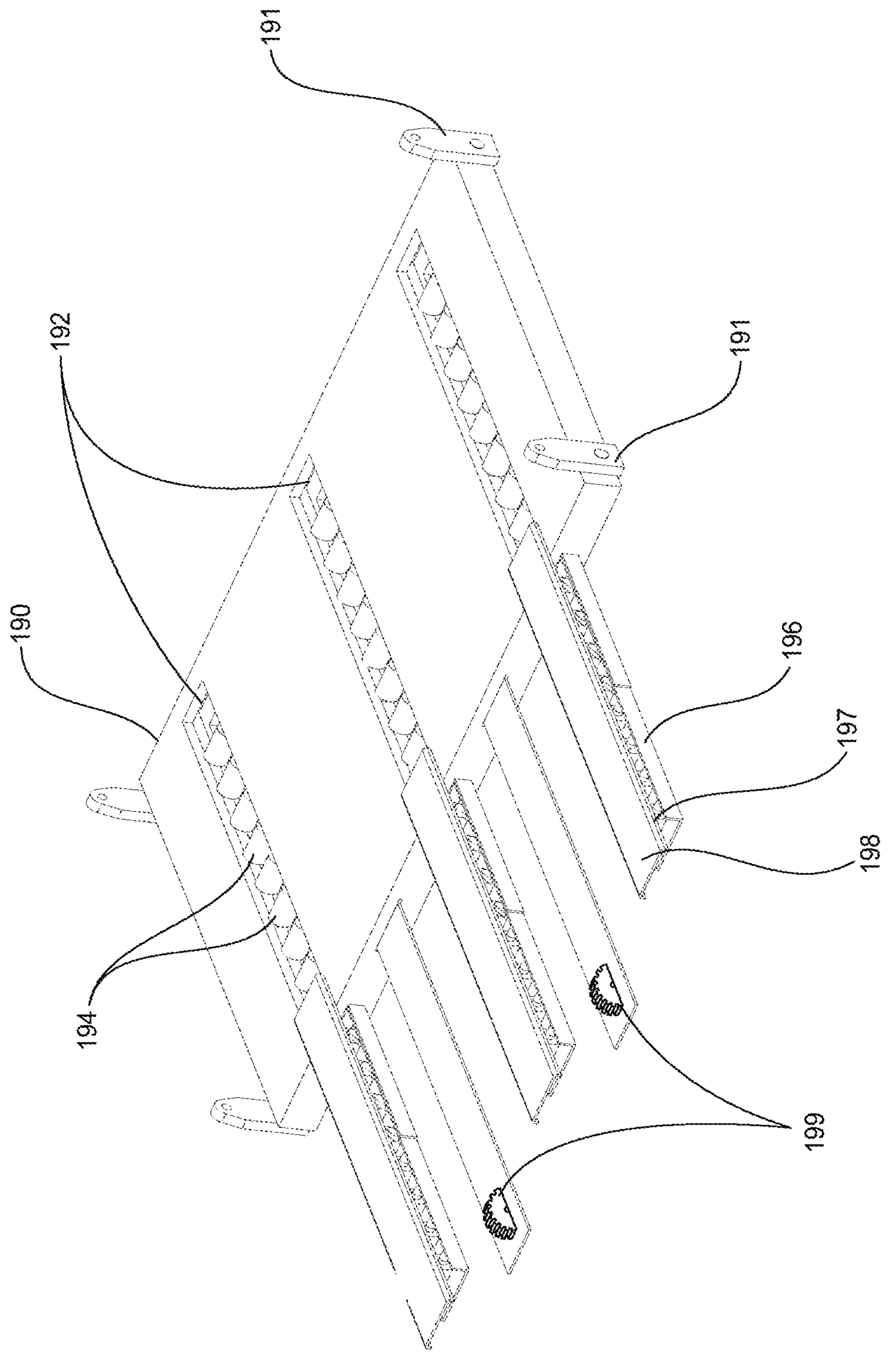
Figure 9:
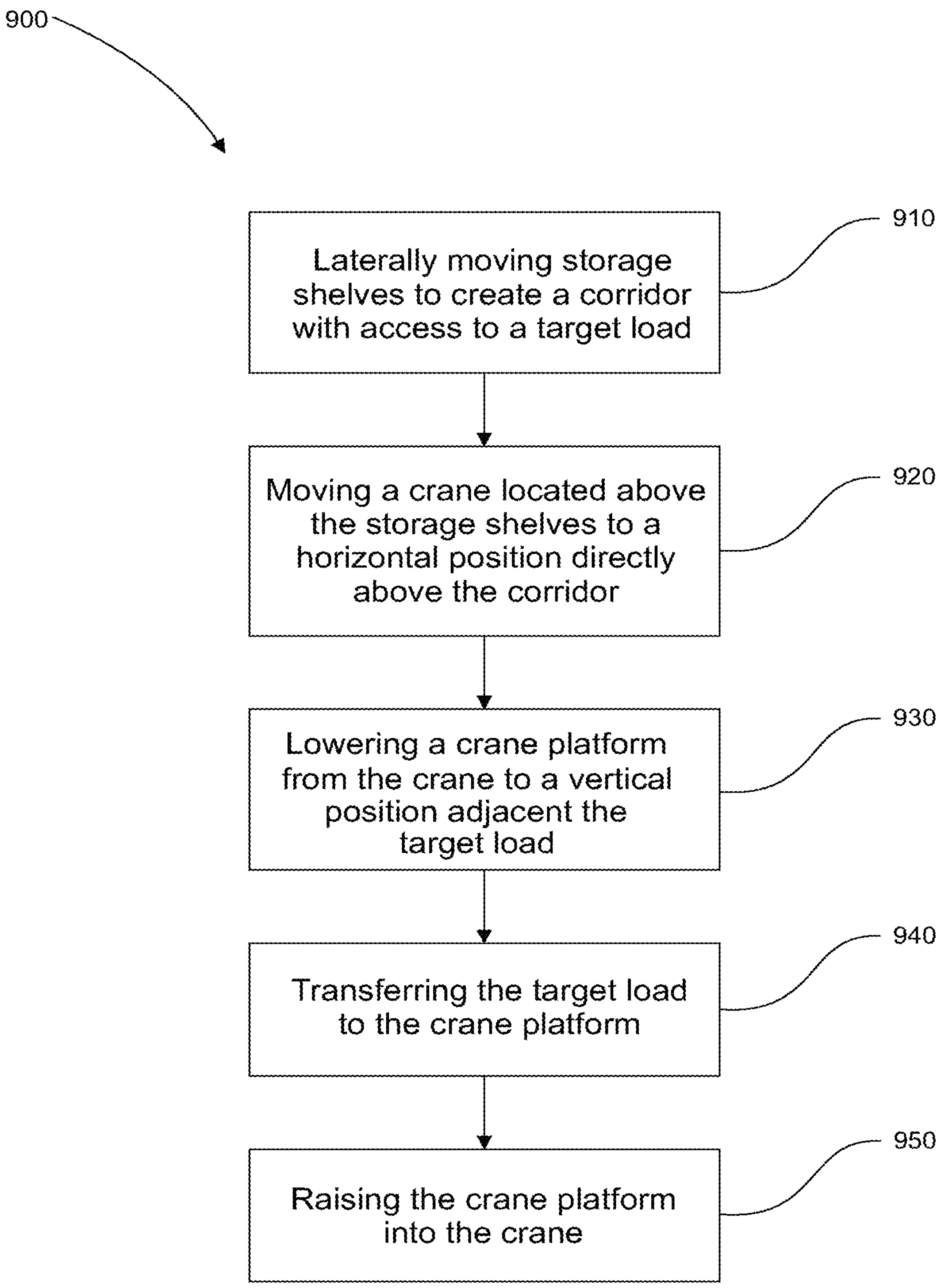
Figure 10:
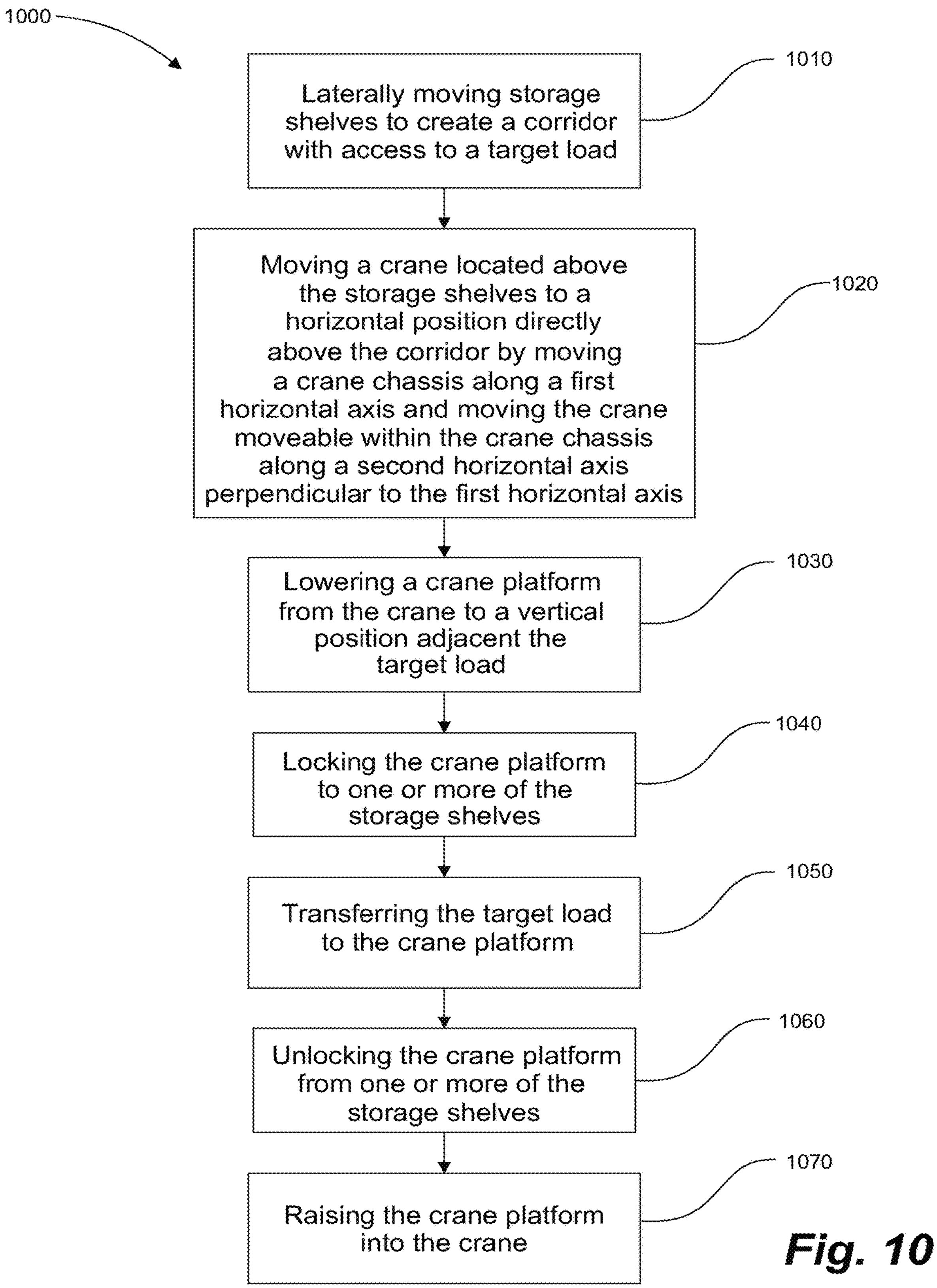
Figure 11:
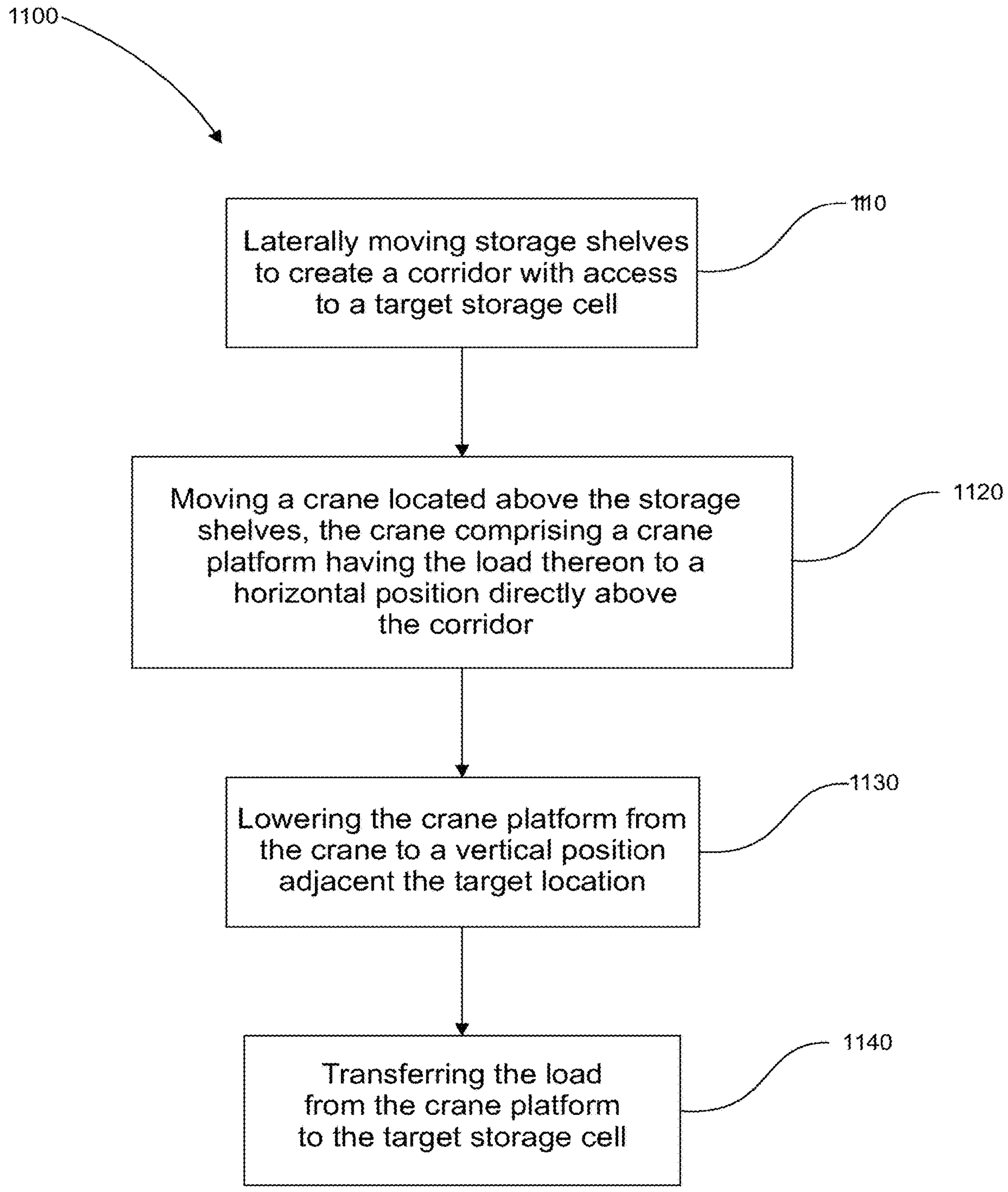
Figure 12:
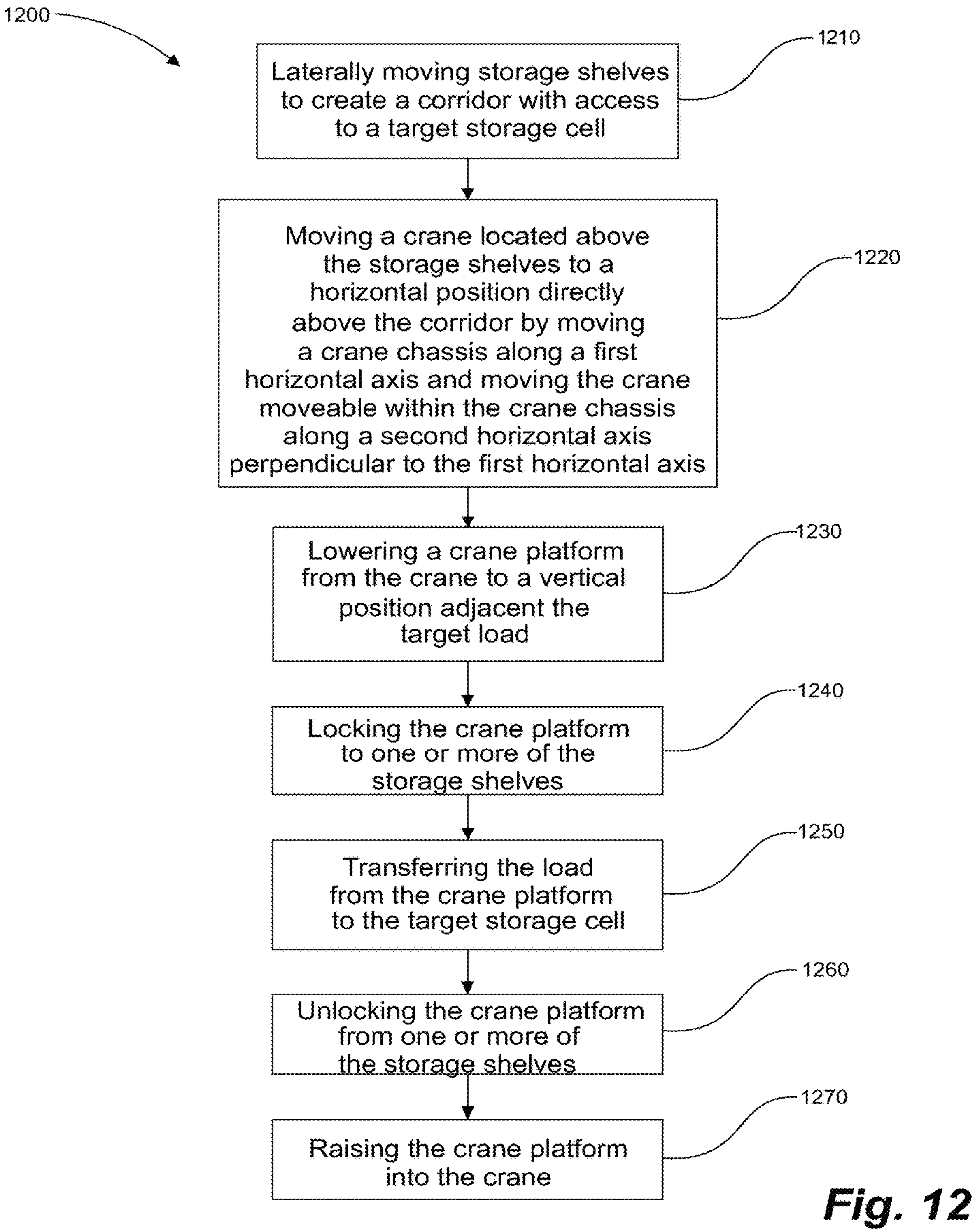
Figure 13:
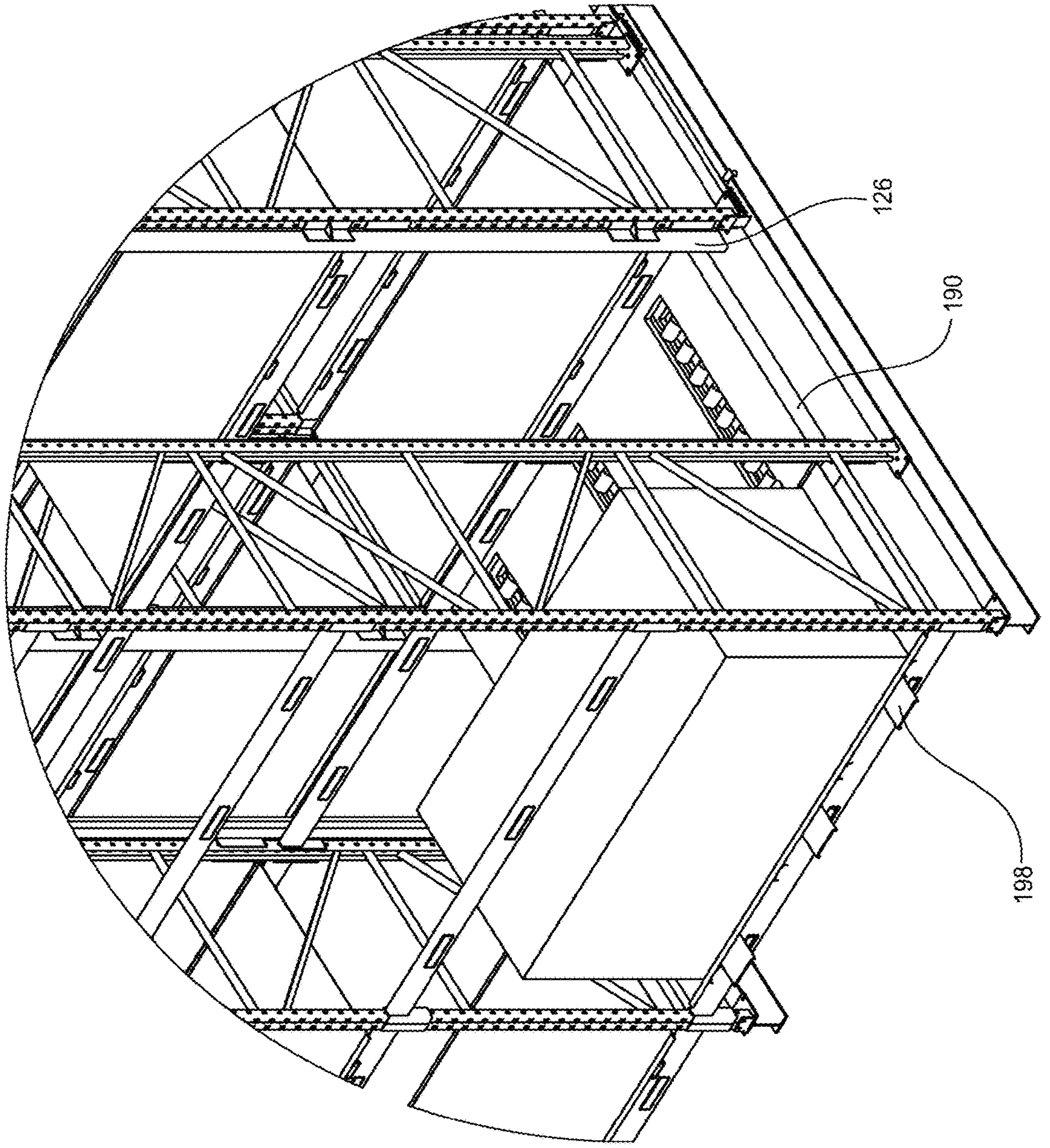
Figure 15:
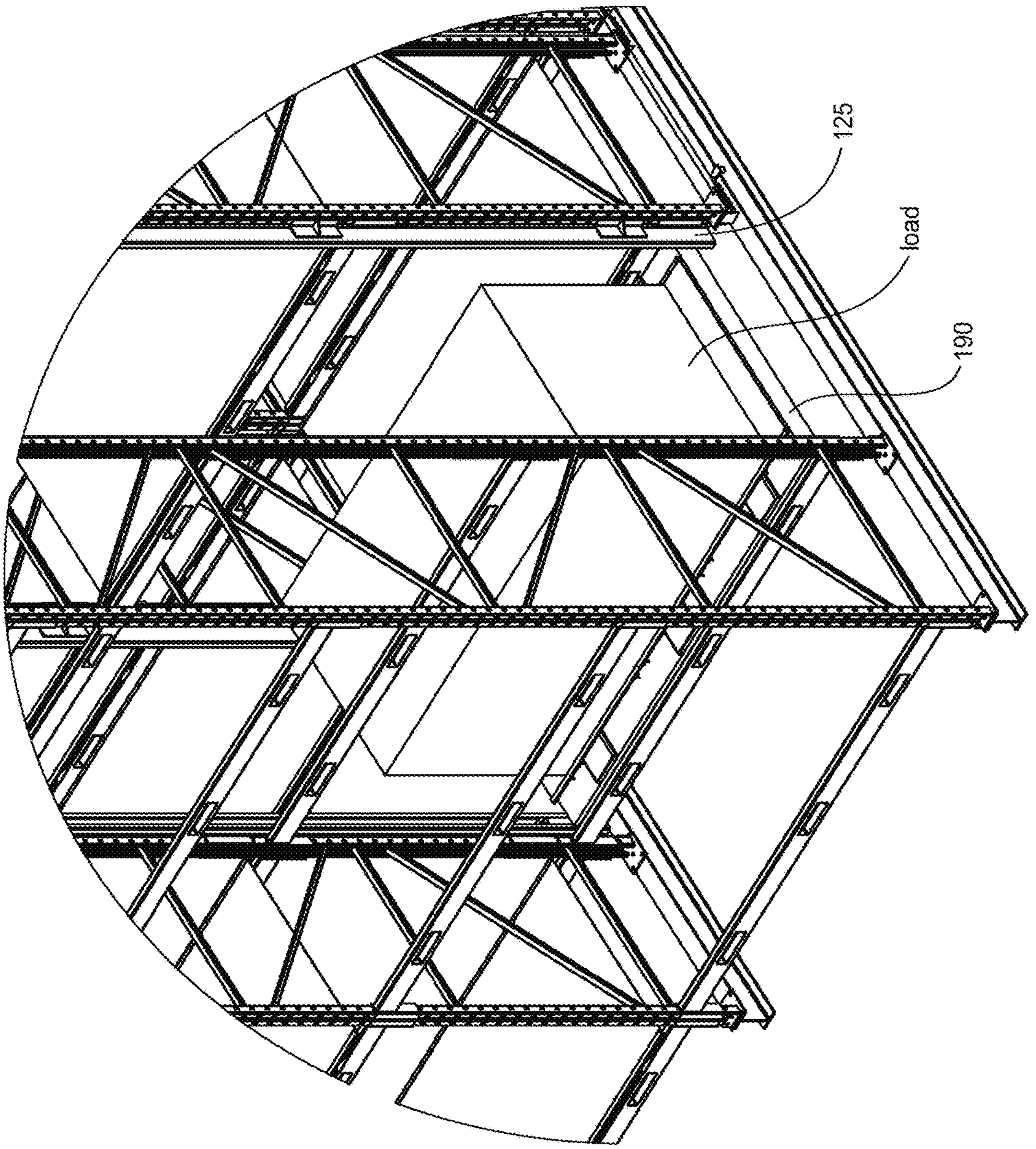
Figure 16:
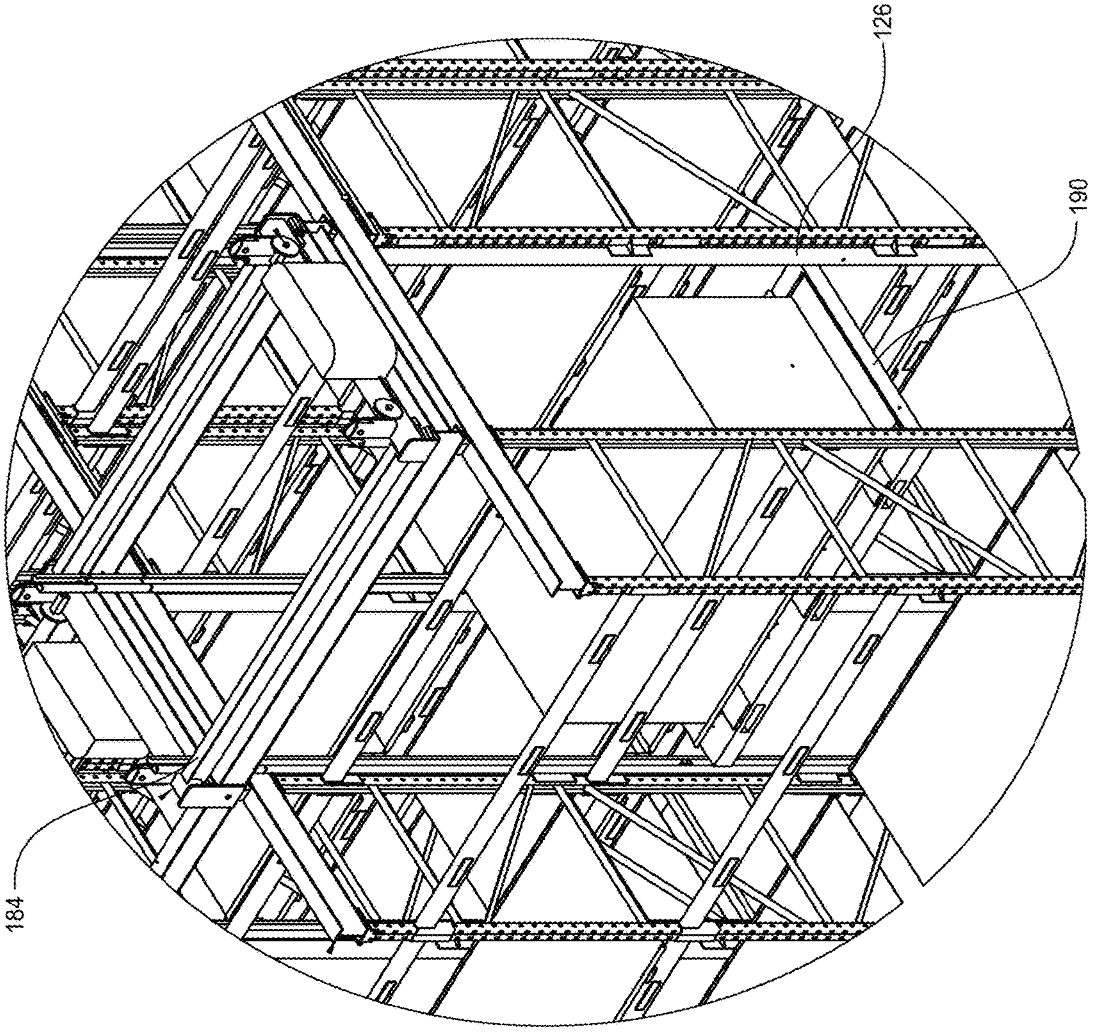
Figure 17:
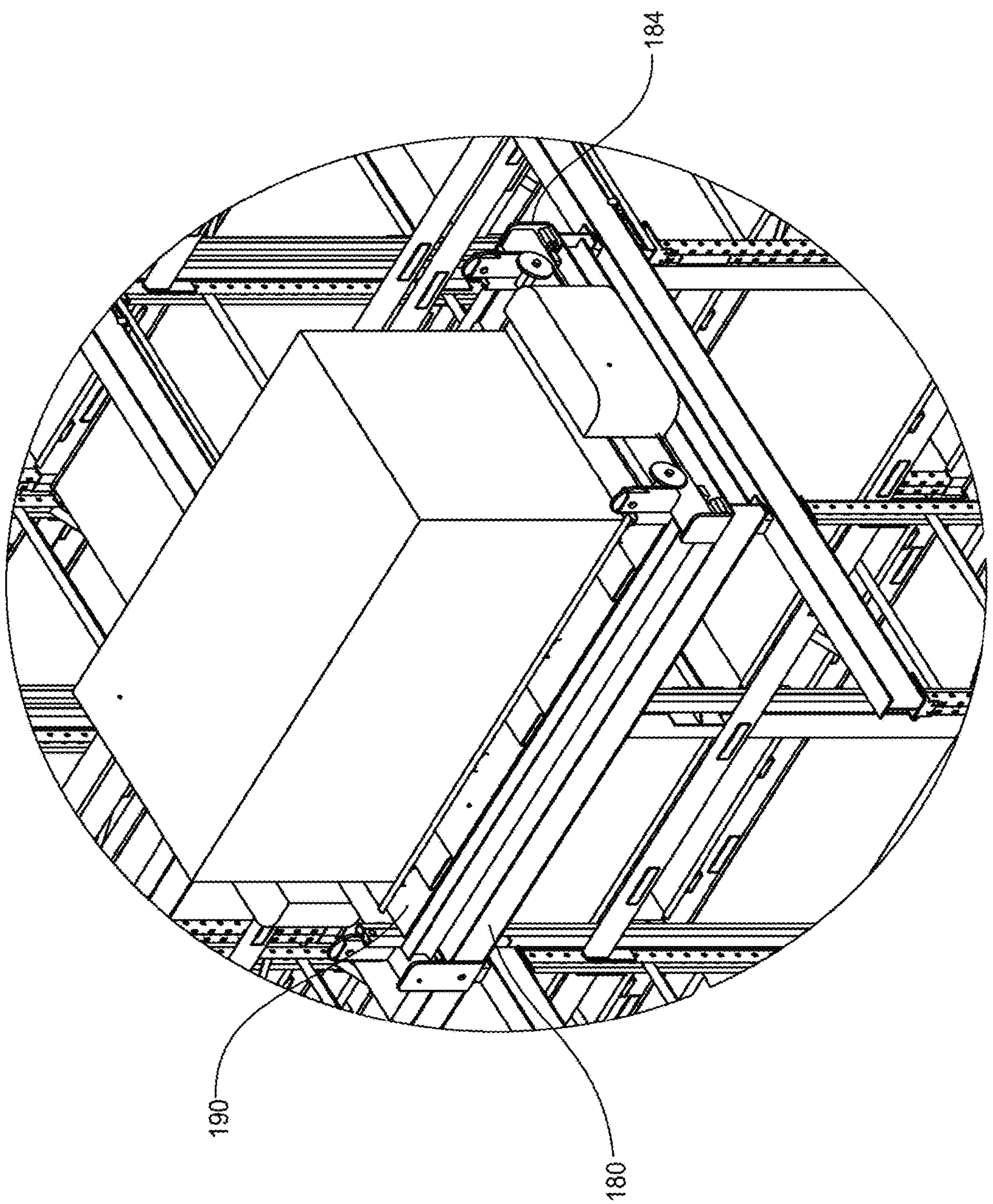
Figure 18:
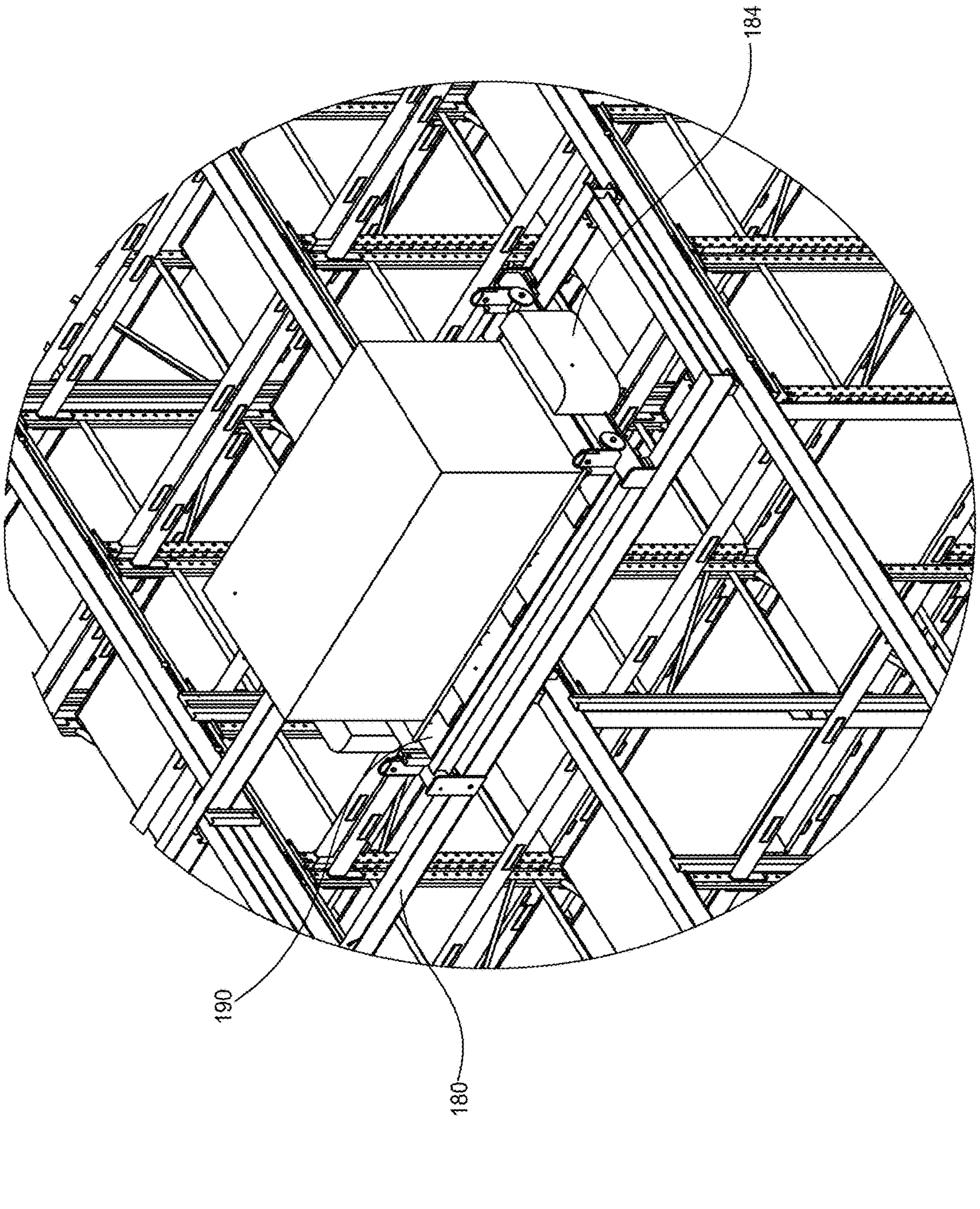
Figure 19:
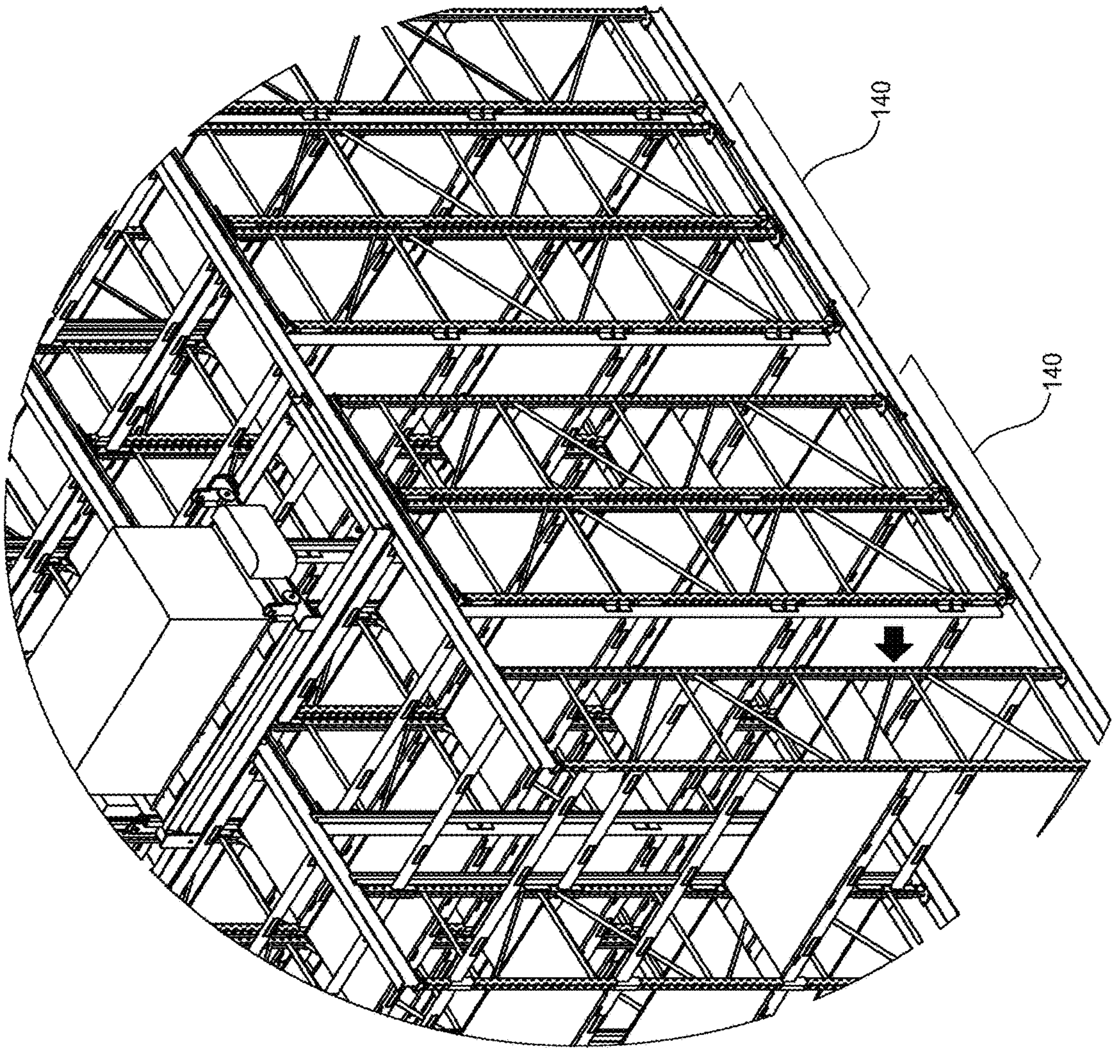
Figure 20:
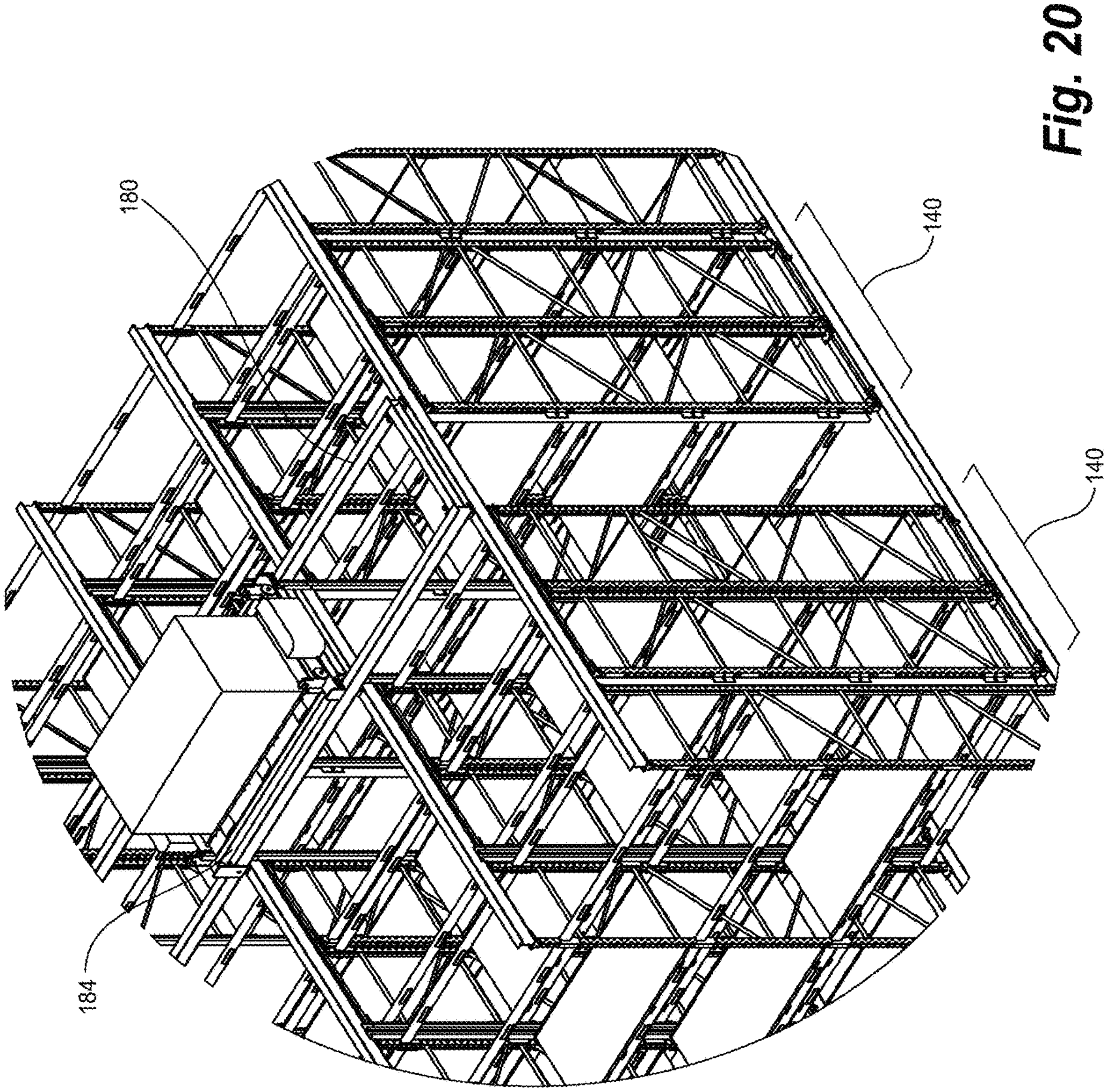
Figure 21A:
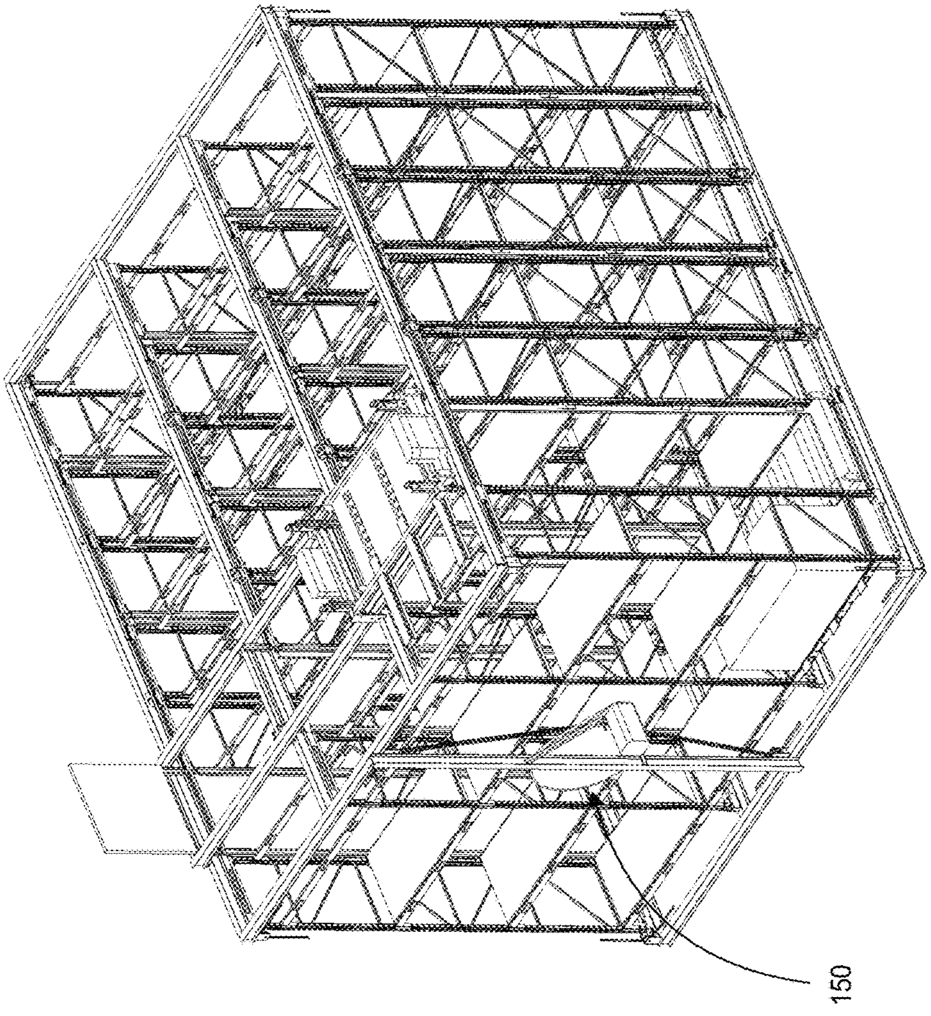
Figure 21B:
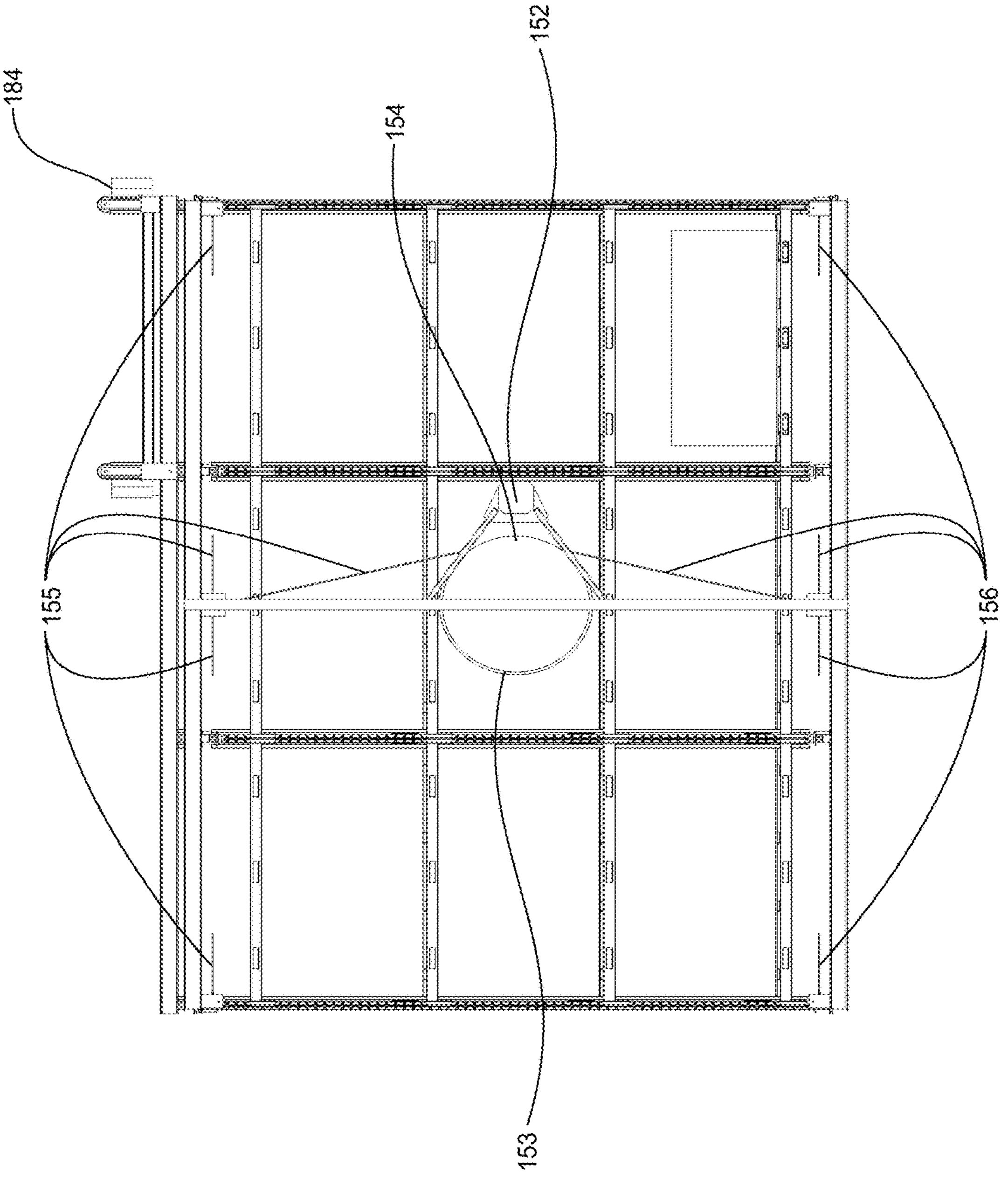
Figure 21C:
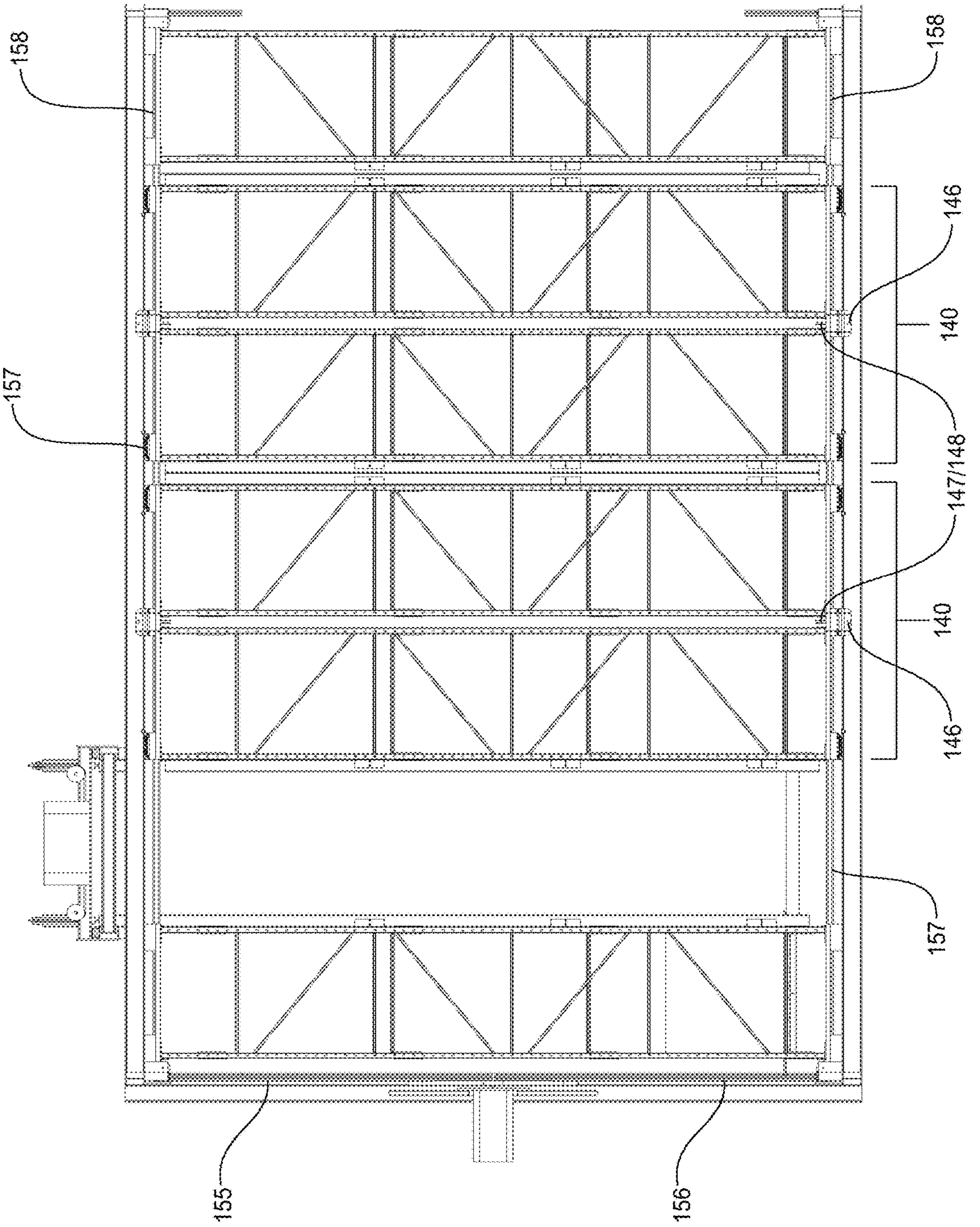
Figure 21D:
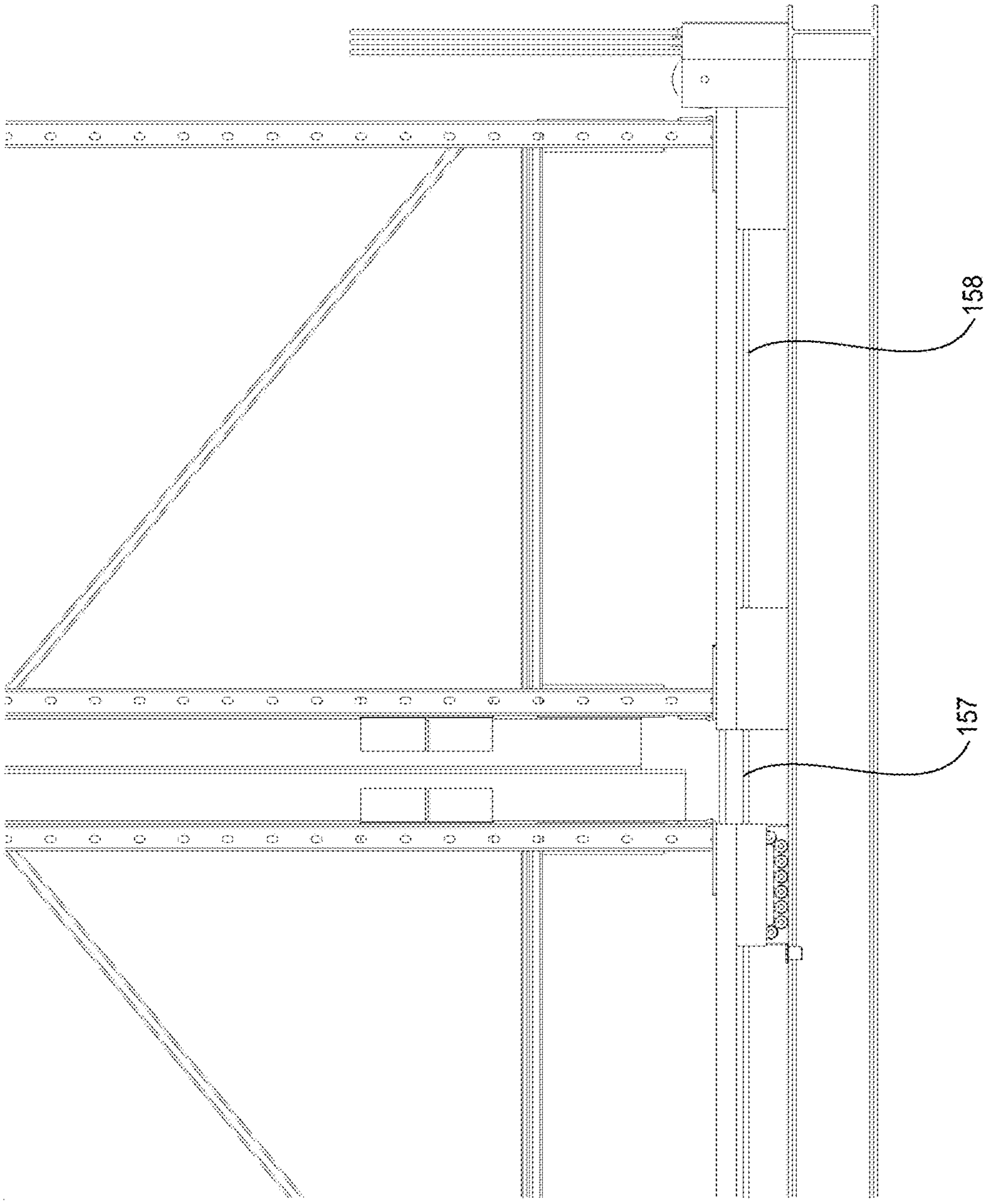
Figure 21E:
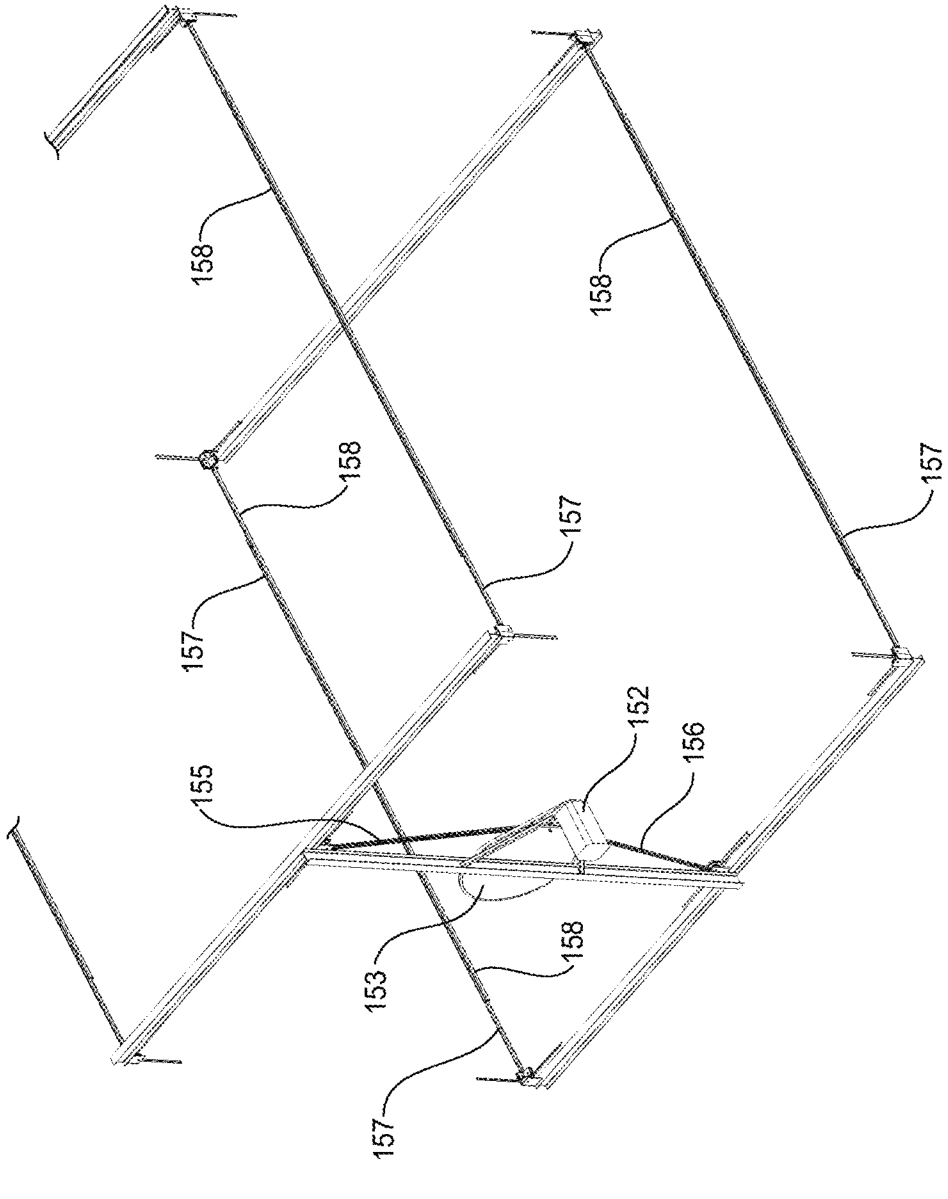
Figure 21F:
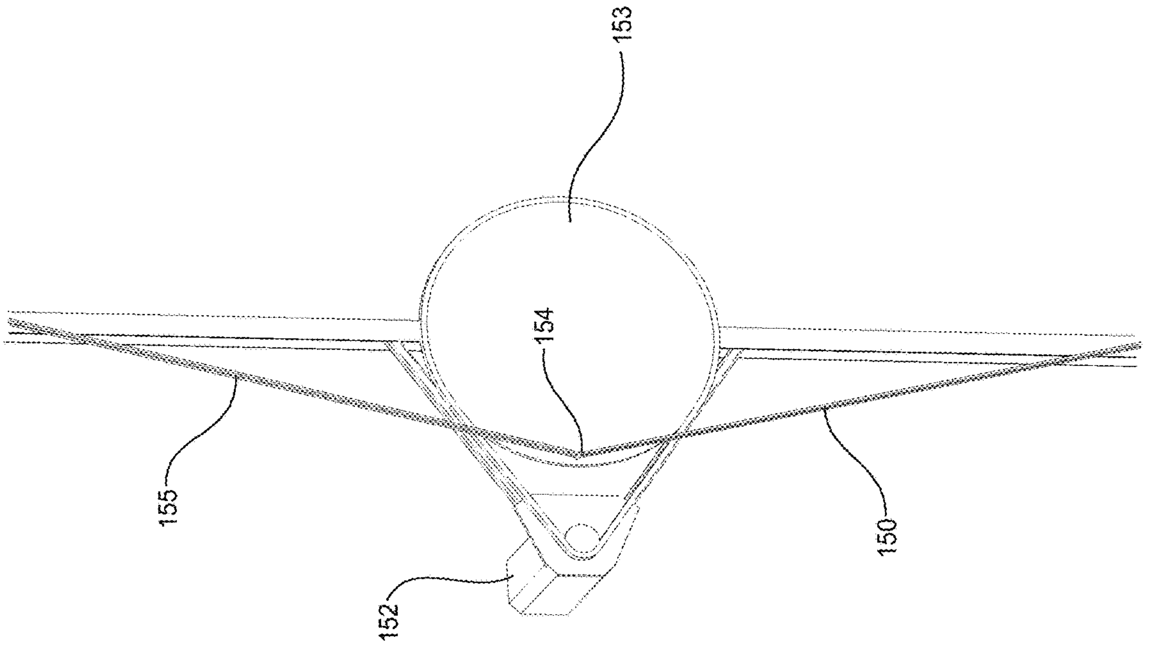
Figure 22:
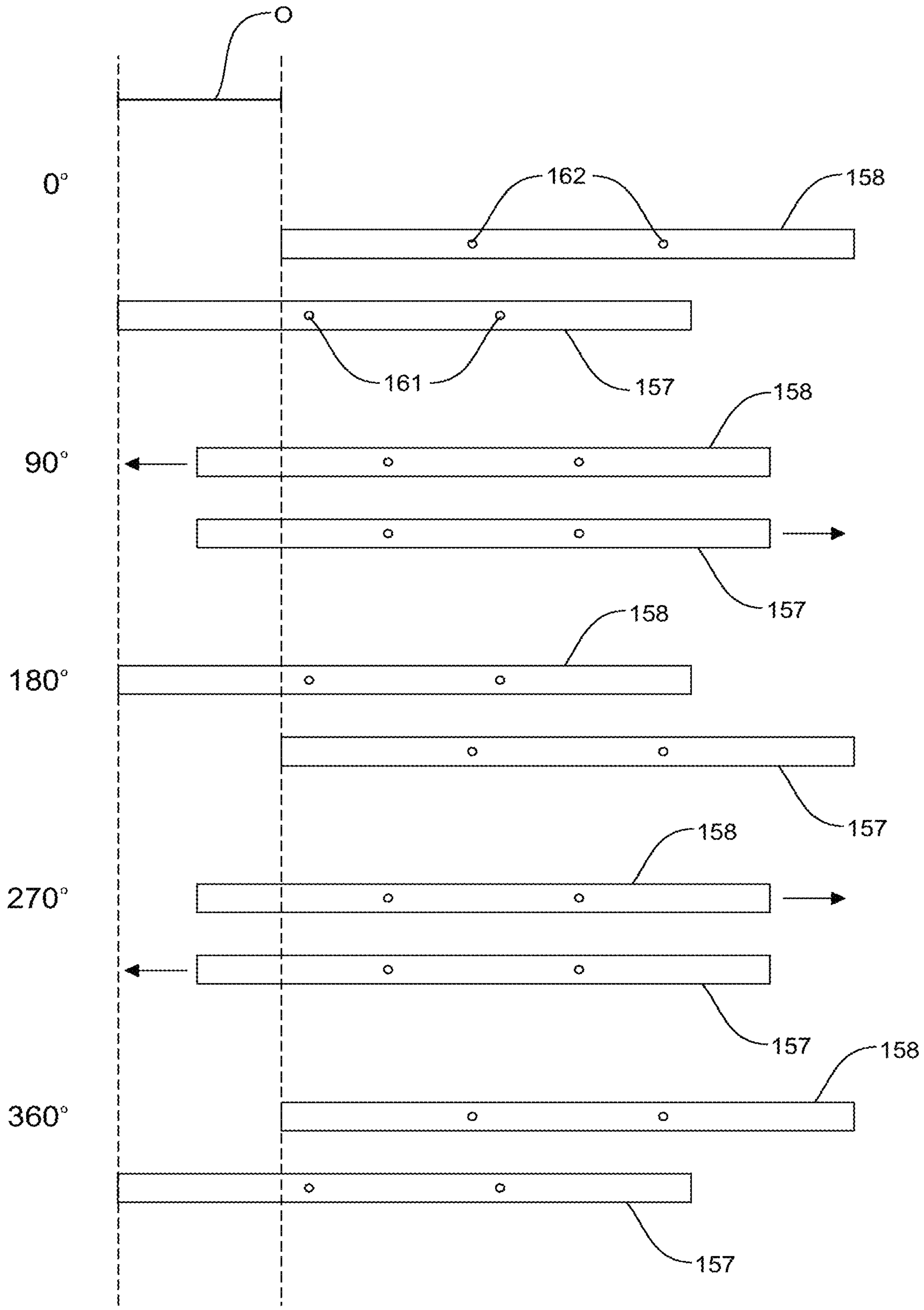
Figure 23:
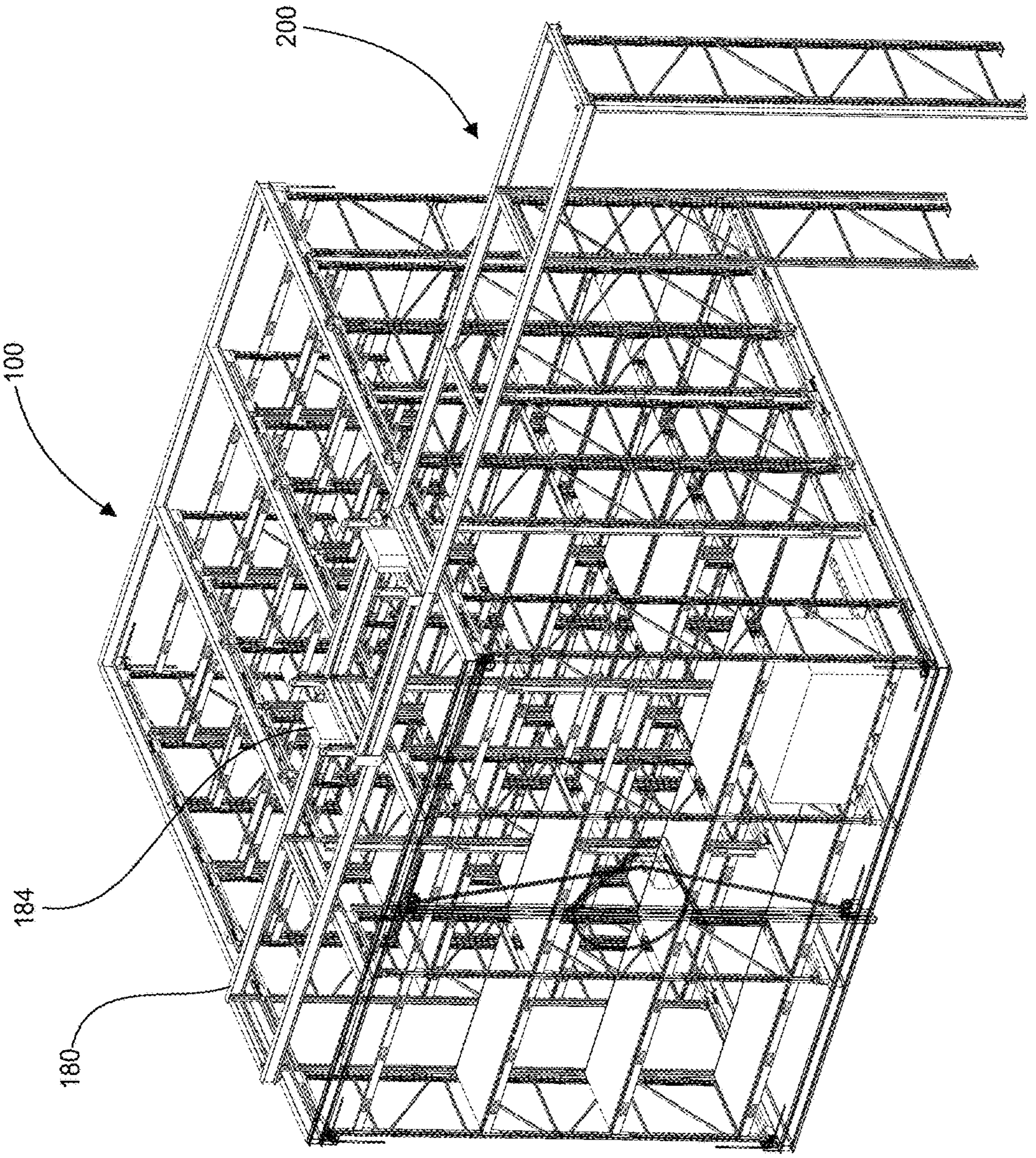

1 comprising uprights and beams;

FIG. 3 is a 3D section view of an upright of the system of FIG. 1;

FIG. 4 is an isometric view of an embodiment of a shelf;

FIG. 5 is an isometric view of an embodiment of a crane chassis;

FIG. 6 is an trimetric view of the crane chassis of FIG. 5 further comprising a portion of an embodiment of a crane;

FIG. 7 is an isometric view of the crane of FIG. 6;

FIG. 8A is a dimetric view of an embodiment of a crane platform having a retrieval mechanism;

FIG. 8B is a perspective a dimetric view of an embodiment of a crane platform having an alternative retrieval mechanism;

FIG. 9 is a flowchart of an example method for accessing a load in a storage and retrieval system;

FIG. 10 is a flowchart illustrating additional steps of the method of FIG. 9;

FIG. 11 is a flowchart of an example method for storing a load in a storage and retrieval system;

FIG. 12 is a flowchart illustrating additional steps of the method of FIG. 11;

FIG. 13 is a detail view of an embodiment of an automated dynamic storage system with a crane platform located adjacent a target load;

FIGS. 14A to 14E are dimetric views of an embodiment of the crane platform of FIG. 13 illustrating the movement of extending components;

FIG. 15 is an isometric view of the system of FIG. 13 with the target load loaded onto the crane platform;

FIG. 16 is an isometric view of the system of FIG. 13 with the crane platform moving upwards;

FIG. 17 is an isometric view of the system of FIG. 13 with the crane platform having the target load in a crane;

FIG. 18 is an isometric view of the system of FIG. 13 with the crane moving with a crane chassis;

FIGS. 19 and 20 are isometric views of the system of FIG. 13 with the crane, crane chassis and shelves moving;

FIG. 21A is an trimetric view of an exemplary embodiment a drive mechanism of an automated dynamic storage system;

FIG. 21 B is an orthographic view of the system of FIG. 21A:

FIG. 21C is an orthographic view of the system of FIG. 21A;

FIG. 21D is an orthographic view of the system of FIG. 21A showing embodiments of drive members; FIG. 21E is an isometric view of an exemplary embodiment of a drive mechanism of an automated dynamic storage system specifically focusing on certain moving elements; FIG. 21F is a 3d view of an exemplary embodiment of a drive mechanism;

FIG. 22 is a diagram showing the relative positions of drive members of the system of FIG. 21A corresponding to different positions of a sprocket of the drive mechanism; and FIG. 23 is an dimetric view of an exemplary embodiment of a dynamic storage system wherein tracks/channels of a crane chassis can be aligned with tracks/channels of a transfer section.

DETAILED DESCRIPTION

Generally, the present disclosure discloses a storage system comprising a dynamic structure of storage cells comprising one or more shelves, at least one of the shelves being moveably connected to the structure and having one or more cranes to retrieve and transfer storage loads.

Figure 2:
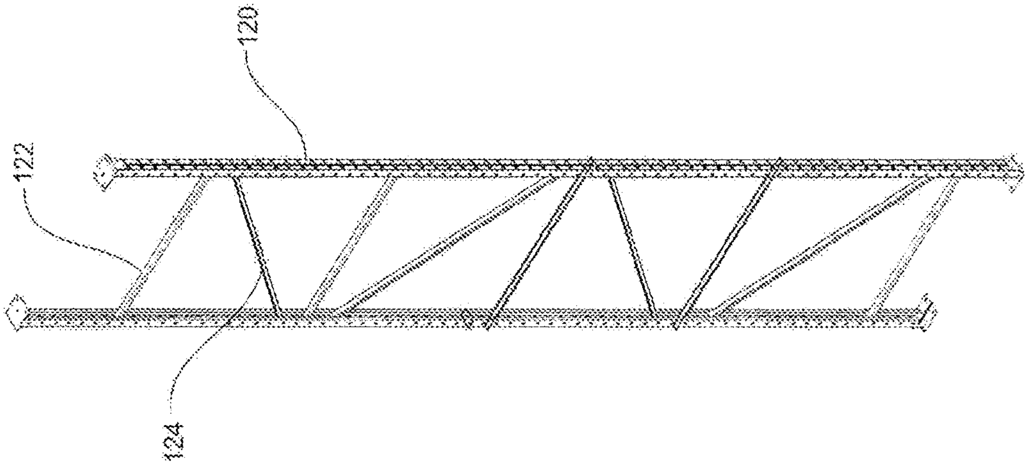
FIG. 2 is an isometric view of a portion of the system of FIG.

In an embodiment, the storage system 100 comprises a frame structure 102. In an embodiment, the frame structure 102 is generally in the shape of a rectangular prism and comprises a first side 104, a second side 106, a third side 108, a fourth side 110, a top 112 and a bottom 114. Although embodiments herein generally relate to a rectangular prism frame structure 102, the frame structure can be any shape suitable to its application. Referring to FIGS. 1 and 2, the frame structure 102 may be constructed from vertical uprights or columns 120, horizontal beams 122 and diagonal support members 124, that can be made from metal, composite or plastic depending on the anticipated mass of the products to be stored in the storage cells and overall structure, and can be field adjustable or fixed as required by the application. Referring to FIG. 1, directions representing an x-axis, a y-axis and a z-axis are depicted for reference. The x-axis or first horizontal axis can be generally defined as perpendicular between the first side 104 and the second side 106, the y-axis or second horizontal axis can be generally defined as perpendicular between the third side 106 and the fourth side 108, and the z-axis or vertical axis can be generally defined as perpendicular between the top 112 and the bottom 114.

In embodiments, elements that require actuation to control and/or automate the storage system 100 are interfaced with a controller 130. The controller 130 can be any controller suitable for the application and may also be a computer, a programmable logic controller, a microcontroller or the like.

Referring to FIGS. 1, 3 and 4, in embodiments, the storage system 100 comprises one or more shelves 140 positioned within the frame structure 102. In embodiments, the shelves 140 are moveably attached to the frame structure 102. In embodiments, the shelves 140 comprise shelf rolling elements that are configured to fit within tracks or channels located within or on horizontal beams 122 of the frame structure 102 proximate the top 112 and/or the bottom 114 thereof. In embodiments, additional shelf rolling elements may be located at other locations on the shelves 140 corresponding to other horizontal beams 122. In these embodiments, the shelves 140 are configured to move laterally along the x-axis. In embodiments, the shelf rolling elements are machine style rollers, wheels, skates, or the like, as appropriate for the application.

In embodiments, the shelves 140 comprise a drive mechanism 150 for moving the shelves 140, such as along the x-axis. The drive mechanism 150 can comprise a top drive mechanism proximate the top 112 and a bottom drive mechanism proximate the bottom 114 thereof. In embodiments, the top and bottom drive mechanisms 150 can comprise one or more electric motors. In other embodiments, the top and bottom drive mechanisms 150 can be operatively coupled to, and configured to be driven by, a single electric motor. In embodiments, the top drive mechanism drives one or more of the shelf rolling elements proximate the top 112 and the bottom drive mechanism drives one or more of the shelf rolling elements proximate the bottom to move the first shelf 140. In embodiments, the bottom drive mechanism may interact with the floor of the facility in which the storage system 100 resides to move the first shelf 140. In embodiments, the top and bottom drive mechanisms 150 may each comprise a motor coupled to a drive wheel, the wheels residing in the tracks or channels of the horizontal beams 122 and being driven by the top and bottom drive mechanisms 150 to move the shelf 140, and the shelf rolling elements are non-driven passive elements. In embodiments, one or more intermediate drive mechanisms may drive the additional shelf rolling elements or intermediate drive wheels to provide additional motive force to assist in moving the shelf 140. In embodiments, the top drive mechanism, the bottom drive mechanism and/or the one or more intermediate drive mechanisms can be actuated simultaneously and/or linked together mechanically to assist in maintaining alignment and preventing jamming or tipping of the shelf 140. In embodiments, the top drive mechanism, the bottom drive mechanism and/or the one or more intermediate drive mechanisms are interfaced with and controlled by the controller 130

In other embodiments, the drive mechanism 150 can comprise any other suitable mechanism for moving the shelves 140. For example, the drive mechanism can comprise one or more pneumatic or hydraulic pistons connected to the shelves 140 and the frame structure 102, such that extension and retraction of the arm affects lateral movement of the shelves 140 relative to the frame structure 102. Alternatively, in embodiments with multiple shelves 140, the piston can connect between a first shelf 140 and one or more adjacent additional shelves 140 to affect relative movement therebetween. Multiple hydraulic pistons can be spaced vertically along the shelf and actuated simultaneously for greater stability of the shelves 140 and to mitigate the potential for tipping.

In embodiments, the shelves 140 each comprise a shelf locking mechanism 146 to fix the shelves 140 to the frame structure 102 and prevent relative movement therebetween. In embodiments, the shelf locking mechanism 146 comprises one or more shelf locking elements that extend from the shelves 140 against the frame structure 102 or the floor of the facility, or vice versa, to mechanically maintain the position of the shelves 140 relative to the frame structure 102. In embodiments, the one or more shelf locking elements engages with the drive mechanisms to act as a brake thereon. In embodiments, the one or more shelf locking elements comprises toothed gears, cams, spurs or the like to engage with the frame structure 102. In embodiments, the frame structure 102 comprises one or more apertures adapted to receive the one or more shelf locking elements in an extended position to maintain the position of the shelves 140 relative to the frame structure 102. In embodiments, the shelf locking elements comprise actuators that are interfaced with and controlled by the controller 130. In embodiments, the shelf locking elements act frictionally to maintain the position of the shelves 140 relative to the frame structure and may comprise pneumatically or hydraulically actuated cylinders that lock into plates on the frame structure 102. The cylinders may have feedback so that controller 130 can confirm their locked state.

In embodiments, the shelves 140 each comprise a plurality of storage cells 141 arranged in horizontal rows and vertical columns. The plurality of storage cells 141 can be comprised of a first plurality of storage cells 142 on a first shelf side of the shelves 140 facing the first side 104. In embodiments, the plurality of storage cells 141 further comprises a second plurality of storage cells 144 on a second shelf side of the shelves 140 facing the second side 106. The storage cells 142,144 may be configured such that their contents are accessible from only one shelf side, or can be configured such that their contents are accessible from both shelf sides. In embodiments, the first plurality of storage cells 142 and second plurality of storage cells 144 are of uniform size. The storage cells 141 may also be arranged in any other configuration suitable for the application and, in some embodiments, can have differing sizes.

In embodiments, the storage system 100 comprises a first end shelf 160 proximate the first side 104 comprising a plurality of storage cells 141. In embodiments, the storage system 100 further comprises a second end shelf 170 proximate the second side 106 comprising a plurality of storage cells 141. In embodiments, the first end shelf 160 and the second end shelf 170 are attached to and fixed relative to the frame structure 102. In such a configuration, the shelves 140 are moveable between the stationary first and second end shelves 160,170. A sufficient gap between the shelves 140, 160,170 can be provided such that space can be created between two shelves for a crane to access the contents of the storage cells 141 thereof, as described in greater detail below.

In an exemplary embodiment, as shown in FIGS. 21A-22, a drive mechanism 150 for the shelves 140 comprises an electric motor 152 configured to rotate a sprocket 153. A boss or sprocket pin 154 can extend from the sprocket 153 or a plate attached to the sprocket 153, the pin 154 in turn being connected to one or more first cables 155 and one or more second cables 156, the first cables 155 being connected to first drive members 157 located at the top and bottom of the frame structure 102, and the second cables 156 being connected to second drive members 158 also located at the top and bottom of the frame structure 102. The first and second cables 155,156 are routed, for example via a system of pulleys, such that the first cables 155 pull the first drive members 157 in a first direction along the x-axis and the second cables pull the second drive members 158 in a second direction along the x-axis opposite the first direction when the sprocket 153 is rotated from 0° to 180°. When the sprocket 153 is rotated from 180° to 360°/0°, the first cables 155 pull the first drive members 157 in the second direction and the second cables 156 pull the second drive members 158 in the first direction. The drive mechanism 150 can be configured such that the first and second drive members 157,158 translate a distance D equal to at least the space required between shelves 140 for a crane platform 190 to travel vertically therethrough. The first and second drive members 157,158 can also have respective first and second drive apertures 161,162 configured to receive corresponding first and second drive pins 147,148 located on the shelf 140 proximate the top and the bottom, the drive pins 147,148 actuable between an engaged and disengaged position. When it is desired to move one or more of the shelves 140 in the first direction, the drive pins 147/148 of the shelves to be moved corresponding to the drive members 157/158 positioned to move in said first direction can be actuated to the engaged position to extend through the corresponding drive apertures 161/162 of the drive members 157/158, such that the shelves to be moved 140 and corresponding drive members are coupled. Once the engagement between the shelves to be moved 140 and appropriate drive members are confirmed to be coupled, such as by sensors configured to detect the full actuation of the drive pins to the engaged position, the motor 152 can be operated to rotate the sprocket 153 180° such that the shelves 140 move with the drive member 157/158 in the first direction. In embodiments wherein the shelves 140 are locked to the frame structure 102 with a shelf locking mechanism 146, the shelf locking mechanism 146 can be disengaged prior to operation of the motor to move the shelves 140. Once the sprocket 153 has been rotated 180°, the drive pins 147/148 of the shelves 140 can be disengaged from the drive members 157/158 and the shelf locking mechanism 146, if present, can be re-engaged to secure the shelf 140 to the frame structure 102. To move one or more of the shelves 140 in the second direction, the same procedure is followed, except the drive pins 147/148 corresponding with the drive members 157/158 positioned to move in the second direction are engaged.

In embodiments where the frame structure 102 is generally in the shape of a rectangular prism, the top 112 correspondingly defines a planar sub frame of a generally rectangular shape. In embodiments, the frame structure 102 comprises a plurality of substantially parallel rails 172 at the top 112. In the embodiment depicted in FIG. 1, the rails 172 run along substantially the full length of the frame structure 102 along the x-axis. In embodiments, the rails may be tracks or channels configured to receive corresponding wheels, gears, or sprockets of a crane. In embodiments, the plurality rails 172 may be a pair of rails.

Referring to FIGS. 1 and 5, in embodiments, the storage system 100 comprises a crane chassis 180. The crane chassis 180 comprises a generally rectangular frame and is movably attached to two or more of the plurality of rails 172. In embodiments, the crane chassis 180 comprises chassis rolling elements and a crane chassis drive mechanism configured to drive the chassis rolling elements along the plurality of rails 172. In embodiments, the crane chassis drive mechanism is interfaced with and controlled by the controller 130. In embodiments, the chassis rolling elements comprise machine style rollers, wheels, sprockets, and the like as appropriate for the application. In embodiments wherein the chassis rolling elements are sprockets or gears, the rails 172 can comprise corresponding teeth or chains configured to permit the sprockets to roll therealong. In other embodiments, the chassis drive mechanism can be any other suitable mechanism known in the art for moving a vehicle along rails.

In embodiments, the crane chassis 180 comprises a chassis locking mechanism to fix the crane chassis 180 to the frame structure 102 and/or to one or more of the plurality of rails 172. In embodiments, the chassis locking mechanism comprises one or more chassis locking elements that extend from the crane chassis 180 against the frame structure 102 and/or one or more of the plurality of rails 172 to mechanically retain the crane chassis thereto. In embodiments, the one or more chassis locking elements engages with the crane chassis drive mechanism to act as a brake thereon. In embodiments, the one or more chassis locking elements comprises toothed gears, cams, spurs or the like to engage with the frame structure 102. In embodiments, the frame structure 102 and/or one or more of the plurality of rails 172 comprise one or more apertures adapted to receive the one or more chassis locking elements in an extended position to retain the crane chassis 180 thereto. In embodiments, chassis locking elements comprise actuators that are interfaced with and controlled by the controller 130. In embodiments, the chassis locking elements act frictionally to maintain the position of the crane chassis 180 relative to the frame structure and may comprise pneumatic or hydraulic cylinders that lock into plates on the crane chassis 180. The cylinders may have feedback so that controller 130 can confirm their locked state.

In the embodiment depicted in FIGS. 1 and 5, as the plurality of rails 172 run substantially the entire length of the frame structure 102 along the x-axis, the crane chassis 180 can move along the x-axis from between proximate the first side 104 to proximate the second side 106.

Referring to FIGS. 1, 6 and 7, in embodiments, the storage system 100 comprises a crane 184. The crane 184 is moveably attached to the crane chassis 180. In embodiments, the crane 184 comprises crane rolling elements that are configured to fit on or within tracks or channels of the crane chassis 180. In embodiments, the crane 184 comprises a crane drive mechanism to move the crane 184 horizontally along the y-axis along the crane chassis 180. For example, the crane drive mechanism can be an electrical motor configured to drive the crane rolling elements, or pneumatic/hydraulic pistons configured to push and/or pull the crane 184 along the y-axis. In embodiments, the tracks/channels of the crane chassis 180 can be toothed or otherwise configured to mate with the crane rolling elements comprising sprockets, gears, or the like. In embodiments, the tracks/channels of the crane chassis 180 can be substantially flat and the crane rolling elements comprise wheels for travelling along said tracks/channels. In embodiments, the crane drive mechanism is interfaced with and controlled by the controller 130.

In embodiments, the crane 184 comprises a crane locking mechanism to fix the crane 184 to the crane chassis 180. In embodiments, the crane locking mechanism comprises one or more crane locking elements that extend from the crane 184 against the crane chassis 180 to mechanically retain the crane 184 relative the crane chassis 180. In embodiments, the one or more crane locking elements engages with the crane drive mechanism to act as a brake thereon. In embodiments, the one or more crane locking elements comprises toothed gears, cams, spurs or the like to engage with the crane chassis 180. In embodiments, the crane chassis 180 comprises one or more apertures adapted to receive the one or more crane locking elements in an extended position to retain the crane 184 relative to the crane chassis 180. In embodiments, the crane locking elements comprise actuators that are interfaced with and controlled by the controller 130. In embodiments, the crane locking elements act frictionally to maintain the position of the crane 184 relative to the crane chassis 180 and may comprise pneumatic or hydraulic cylinders that lock into plates on the crane chassis 180. These cylinders may have feedback so that controller 130 can confirm their locked state.

In some embodiments, the crane 184 can be configured to be capable of travelling off of the crane chassis 180 and storage system 100, for example to a load delivery/retrieval area or to another storage system 100 for use therein. As shown in FIG. 23, an embodiment of the storage system 100 is shown wherein the tracks/channels of the crane chassis 180 can be aligned with tracks/channels of a transfer section 200 such that the crane 184 can travel from the crane chassis 180 to the transfer section 200. The transfer section 200 in turn can be connected to another structure such a storage system, load delivery/retrieval area, elevator, or any other structure where it may be desired for the crane 184 to travel to.

Referring to FIGS. 7, 8A, and 8B, in embodiments, the crane 184 further comprises a crane platform 190 and a crane elevator drive mechanism to move the crane platform 190 vertically along the z-axis. In embodiments, the crane elevator drive mechanism is connected to the crane platform 190 with cables. In embodiments, the crane elevator drive mechanism is interfaced with and controlled by the controller 130. In embodiments, the crane platform 190 comprises vertical crane platform alignment elements 191 that are configured to fit within or rest on tracks or channels 126 extending at least partially along vertical columns 120. In embodiments, the vertical crane platform alignment elements 191 are skates, pins, grooves, rollers, wheels, sprockets, gears, or similar components. The vertical crane platform alignment elements 191 cooperate with the tracks or channels 126 of the vertical columns 120 to restrain the crane platform 190 from lateral movement during vertical movement. In embodiments, the vertical tracks or channels 126 can be generally C-shaped channels configured to receive the vertical crane platform alignment elements 191 and prevent lateral movement of the crane platform 190 while the crane platform alignment elements 191 are received therein. In embodiments, the vertical tracks or channels 126 can be rails on which grooves of the crane platform alignment elements 191 are seated. In some embodiments, the crane 184 can comprise vertical crane tracks or channels 186 configured to receive the crane platform alignment elements 191 when the platform is in the raised position. The vertical crane tracks 186 can be configured to be aligned with the vertical tracks 126 of the columns 120 when it is desired to lower the platform 190 from the crane 184.

In embodiments, the crane platform 190 comprises a loading crane platform locking mechanism to secure the crane platform 190 to one or more adjacent shelves 140, 160,170, such as when transferring a load from a storage cell 141 to the platform 190 or vice versa. In embodiments, the loading crane platform locking mechanism comprises one or more loading crane platform locking elements that extend from the crane platform 190 against one or more adjacent shelves 140,160,170 to mechanically retain the crane platform 190 relative the shelves. In embodiments, the shelves 140,160,170 comprise one or more apertures adapted to receive the one or more loading crane platform locking elements in an extended position to retain the crane platform 190 relative to the shelves. In embodiments, the crane platform locking elements are rods that each go through the apertures to transfer load from the crane platform 190 to the shelves 140,160,170. In embodiments, the loading crane platform locking elements comprise actuators that are interfaced with and controlled by the controller 130. In embodiments, the one or more loading crane locking elements engages with crane elevator drive mechanism to act as a brake thereon. In embodiments, the one or more loading crane locking elements comprises toothed gears, cams, spurs or the like to engage with the one or more adjacent shelves 140,160,170.

In embodiments, the crane 184 or crane platform 190 comprises a seated crane platform locking mechanism to secure the crane platform 190 to the crane 184. In embodiments, the seated crane platform locking mechanism comprises one or more seated crane platform locking elements that extend from the crane platform 190 against the crane 184, or vice versa, to mechanically retain the crane platform 190 relative to the crane 184. In embodiments, the one or more seated crane platform locking elements engages with the crane drive mechanism to act as a brake thereon. In embodiments, the one or more seated crane platform locking elements comprises toothed gears, cams, spurs or the like to engage with the crane platform 190. In embodiments, the crane 184 or crane platform 190 comprises one or more apertures adapted to receive the one or more seated crane platform locking elements in an extended position to retain the crane platform 190 to the crane 184. In embodiments wherein the seated crane platform locking elements extend through the apertures, load is transferred from the crane platform 190 to the crane 184. In embodiments, the seated crane platform locking elements comprise actuators that are interfaced with and controlled by the controller 130. In embodiments, the seated crane platform locking elements act frictionally to maintain the position of the crane 184 relative to the crane platform 190 and may comprise pneumatically or hydraulically actuated cylinders that lock into plates on the crane platform 190. The cylinders may have feedback so that controller 130 can confirm their locked state.

In embodiments, the crane platform 190 further comprises an emergency crane platform locking mechanism to secure the crane platform 190 to one or more adjacent shelves 140,160,170 in the event of a failure of the crane elevator drive mechanism. In the event of such a failure, in embodiments, the emergency crane platform locking mechanism comprises one or more emergency crane platform locking elements that extend from the crane platform 190 against one or more adjacent shelves 140,160,170 to mechanically retain the crane platform 190 relative to the shelves. In embodiments, the one or more emergency crane platform locking elements engages with the crane elevator drive mechanism to act as a brake thereon. In embodiments, the one or more emergency crane platform locking elements comprises toothed gears, cams, spurs or the like to engage with the shelves. In embodiments, the emergency crane platform locking elements comprise actuators that are interfaced with and controlled by the controller 130. In embodiments, the emergency crane platform locking elements are operatively coupled to sensors such as accelerometers which actuate the emergency platform locking elements even in the absence of instructions from the controller 130, for example in the event of a power outage. In embodiments, the emergency crane platform locking elements act frictionally to maintain the position of the crane platform 190 relative to the shelves 140,160,170 and may comprise pneumatically or hydraulically actuated cylinders that lock into plates on the shelves 140,160,170. The cylinders may have feedback so that controller 130 can confirm their locked state In embodiments, the crane platform 190 further comprises a transfer mechanism to transfer loads to and from a storage cell 141 and the crane platform 190. Herein, the term "load" refers to the items to be stored in the storage cells 141 as well as pallets, containers, or other structures which are stored and transferred with the load to and from the storage cells 141. In embodiments, the transfer mechanism comprises telescoping elements configured to lift a selected load and transfer it between the crane platform 190 and a selected storage cell 141. In embodiments, the crane platform 190 comprises two or more chambers 192 and the transfer mechanism comprises a plurality of platform rollers 194 located in the each chamber 192, and the telescoping elements comprise a bottom slider 196 and a top slider 198. In the depicted embodiment, each of the bottom slider 196 and the top slider 198 are configured to telescopically extend from the chamber 192 in a first direction or an opposite second direction. In other embodiments, the sliders 196,198 may be configured to extend only in one direction. In embodiments, the bottom slider 196 comprises a plurality of bottom slider rollers 197. In embodiments, the platform rollers 194 and bottom slider rollers 197 are configured to be raised out of the platform 190 and bottom slider 196, respectively, via a linkage similar to pallet jacks or direct hydraulic cylinders on pairs of rollers, or via any other suitable raising mechanism. The embodiment selected for a particular application may depend upon the temperature of the working environment and, in particular, the suitability of hydraulics in cold storage environments may be an issue. In embodiments, the top slider 198 rests atop the plurality of platform rollers 194 and the plurality of bottom slider rollers 197 when they are in a raised configuration. The bottom sliders can be connected to a bottom transfer drive mechanism for extending the bottom sliders 196 in the first or second direction. The top slider 198 can further be connected to a top transfer drive mechanism for extending the top slider 198 in the first or second direction independently of the bottom sliders 196. When it is desired to transfer a load, the bottom slider 196 and top slider 198 can be laterally extended in the direction toward the selected load such that they are both positioned under the load. The platform rollers 194 and bottom slider rollers 197 can then be raised, such that the top slider 198 is raised to contact and lift the selected load. The top slider 198 can then be retracted toward the platform 190 with the bottom slider 196 remaining in the extended position. In this manner, the selected load travels toward the platform 190 over the raised rollers 194,197. Once the selected load has been positioned over the platform 190, the rollers 194,197 can be lowered such that the load rests on the platform 190. When transferred a load from the platform 190 to a selected storage cell 141, the same process can be followed, with the bottom slider 196 being extended toward the selected cell 141 while the top slider 198 remains in position below the load. The rollers 194,197 can then be raised such that the top slider 198 contacts and lifts the load. The top slider 198 can then be extended toward the selected cell 141 to transfer the load over the rollers 194,197 and into the selected cell 141. Once the load has been positioned within the selected cell 141, the rollers 194,197 can be lowered and both the bottom slider 196 and top slider 198 retracted to the platform 190.

In embodiments, the bottom slider 196 can be vertically supported within the selected cell 141, such as by extending the bottom slider 196 through support openings 128 of the frame structure 102, to further assist in lifting the load to be transferred between the selected cell 141 and platform 190 and to avoid cantilevering the load from the platform 190.

In embodiments, the top slider 198 is omitted and the selected load is lifted by and contacts the platform rollers 194 and bottom slider rollers 197. In such embodiments, with reference to FIGS. 8A and 8B, the transfer mechanism further comprises a retrieval mechanism for transferring the load between the selected storage cell 141 and platform 190. In an embodiment, with reference to FIG. 8B the retrieval mechanism comprises one or more spur gears, sprockets, or the like component on the platform 190 and/or the bottom slider 196 that is configured to engage a matching tooth profile on the load and actuated to transfer the load to the platform 190 or to the storage cell 141.

In embodiments, the retrieval mechanism comprises one or more telescoping retrieval arms 199, which are adapted to extend from the crane platform 190 and engage the selected load to pull the load towards the crane platform 190 or push the load toward the selected storage cell 141. In embodiments, the telescoping retrieval arms 199 extend at the same time as the transfer mechanism. In embodiments, with reference to FIG. 8A, the telescoping retrieval arms 199 engage a latching lug or other latching structure on the bottom of a load. In other embodiments, with reference to FIG. 8B, the retrieval arms 199 comprise a spur gear, sprocket, or like component that is configured to engage a matching tooth profile on the load and actuated to transfer the load to the platform 190 or to the storage cell 141. Use of the retrieval arm provides a reliable transfer system and can also be used in embodiments having top slider 198, such as to assist with transfer of the load.

In embodiments, the crane platform 190 is mounted to the rails 172 of a sub frame located above the frame structure 120, such as mounted to the ceiling of the facility.

Methods of Use

FIG. 9 is a flowchart or an example method 900 for accessing a selected load in a storage and retrieval system. Referring to FIG. 9, at block 910, storage shelves 140 are laterally moved to create a corridor with access to a target storage cell 141 containing the target load. At block 920, the crane 184 is moved to a horizontal position directly above the corridor and aligned with the position of the target storage cell 141 on the y-axis. At block 930, the crane platform 190 is lowered from the crane to a vertical position adjacent the target storage cell 141. At block 940, the target load is loaded on the crane platform 190. At block 950, the crane platform 190 is raised into the crane 184.

FIG. 10 is a flowchart for example method 1000 comprising additional steps for the method 900 of FIG. 9. Referring to FIG. 10, at block 1010, storage shelves 140 are moved to create a corridor with access to a target storage cell 141 containing the target load. At block 1020, the crane 184 is moved to a horizontal position directly above the corridor and aligned with the position of the target storage cell 141 on the y-axis by moving a crane chassis 180 along the x-axis and moving the crane 184 moveable within the crane chassis 180 along the y-axis. At block 1030, the crane platform 190 is lowered from the crane 184 to a vertical position adjacent the target storage cell 141. At block 1040, the crane platform 190 is locked to one or more of the storage shelves 140. At block 1050, the target load is loaded on the crane platform 190. At block 1060, the crane platform 190 is unlocked from the one or more storage shelves 140. At block 1070, the crane platform 190 is raised into the crane 184.

FIG. 11 is a flowchart of an example method 1100 for storing a load in a storage and retrieval system. Referring to FIG. 11, at block 1110, storage shelves 140 are laterally moved to create a corridor with access to a target storage cell 141. At block 1120, the crane 184 comprising a crane platform 190 having the load located above the storage shelves 140 is moved to a horizontal position directly above the corridor and aligned with the position of the target storage cell 141 on the y-axis. At block 1130, the crane platform 190 is lowered from the crane 184 to a vertical position adjacent the target storage cell 141. At block 1140, the load is transferred from the crane platform 190 to the target storage cell 141.

FIG. 12 is a flowchart for example method 1200 comprising additional steps for the method 1100 of FIG. 11. At block 1210, storage shelves 140 are laterally moved to create a corridor with access to a target storage cell 141. At block 1220, the crane 184 comprising a crane platform 190 having the load located above the storage shelves 140 is moved to a horizontal position directly above the corridor and aligned with the position of the target storage cell 141 on the y-axis by moving a crane chassis 180 along the x-axis and moving the crane 184 moveable within the crane chassis 180 along the y-axis. At block 1230, the crane platform 190 is lowered from the crane 184 to a vertical position adjacent the target storage cell 141. At block 1240, the crane platform 190 is locked to one or more of the storage shelves 140. At block 1250, the load is transferred from the crane platform 190 to the target storage cell 141. At block 1260, the crane platform 190 is unlocked from the one or more storage shelves 140. At block 1270, the crane platform 190 is raised into the crane 184.

As the movements of the shelves 140 is independent from the movement of the crane platform 190 and crane 184, the shelves 140 can be moved to create the access corridor while the crane platform 190 and crane 184 are being positioned.

EXAMPLES

Referring to FIG. 1, an example embodiment of a storage system 100 is shown with a crane platform 190 adjacent a target storage cell 141 in a loading position. In embodiments, the loading position can be one or more locations on either end of the storage system 100 or a separate loading structure that may be attached to the storage system 100 to allow for loading and unloading of loads to be stored/retrieved to and from the storage system 100, or transfer of loads to another storage system as required.

Referring to FIG. 13, a load to be stored in the storage system 100 is placed in a storage cell 141 in a first end shelf 160, said storage cell 141 functioning as a delivery/retrieval cell at which loads to be stored in the system 100 can be delivered, and loads to be retrieved from the system 100 can be received. In embodiments, the first end shelf 160 can be attached to the frame structure 102 proximate the bottom 114 allowing for large load distribution to the floor, smooth motion of the moving shelf sections, and accurate location of all storage cells 141 relative to each other. Once crane platform 190 is in position for loading, a loading crane platform locking mechanism is engaged to secure the crane platform to the adjacent shelves 140,160,170 and prevent movement thereof. In embodiments, wheels attached to the crane platform 190 are located in vertical channels of the adjacent shelves 140,160,170 to provide further lateral support. In embodiments wherein the loading crane platform locking mechanism extends through apertures in the shelves 140,160,170, the load is supported by the shelves through the loading crane platform locking mechanism.

Figure 14A:
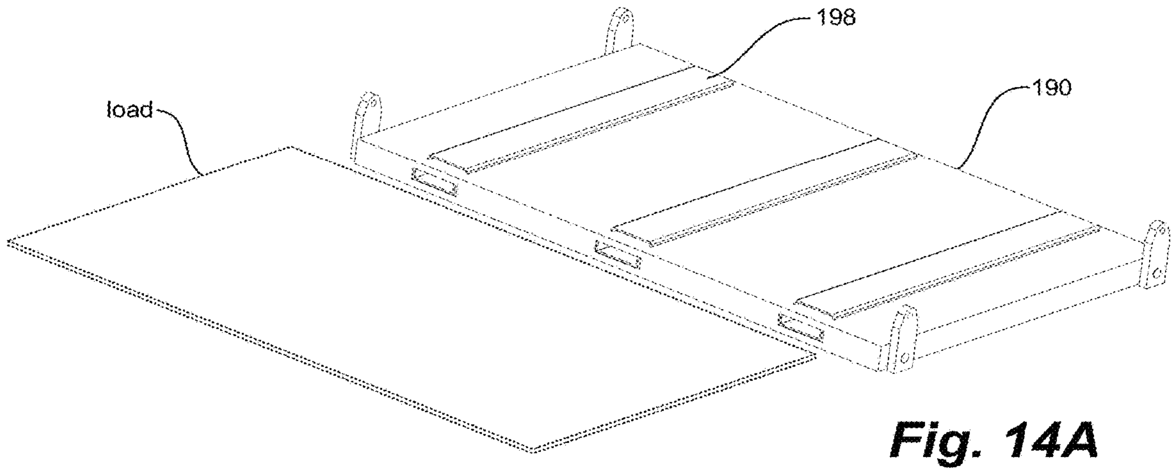
Figure 14B:
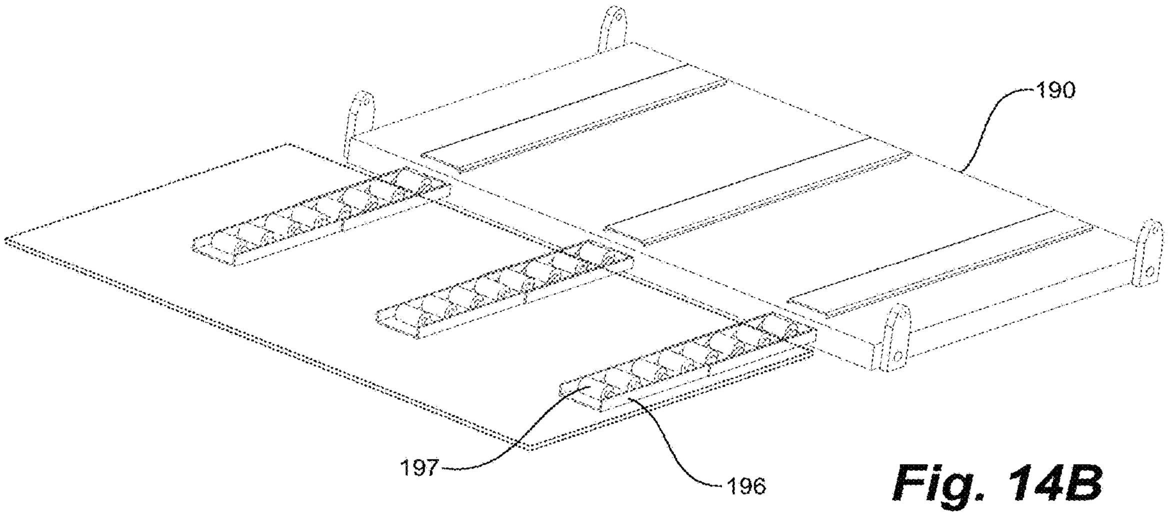
Figure 14C:
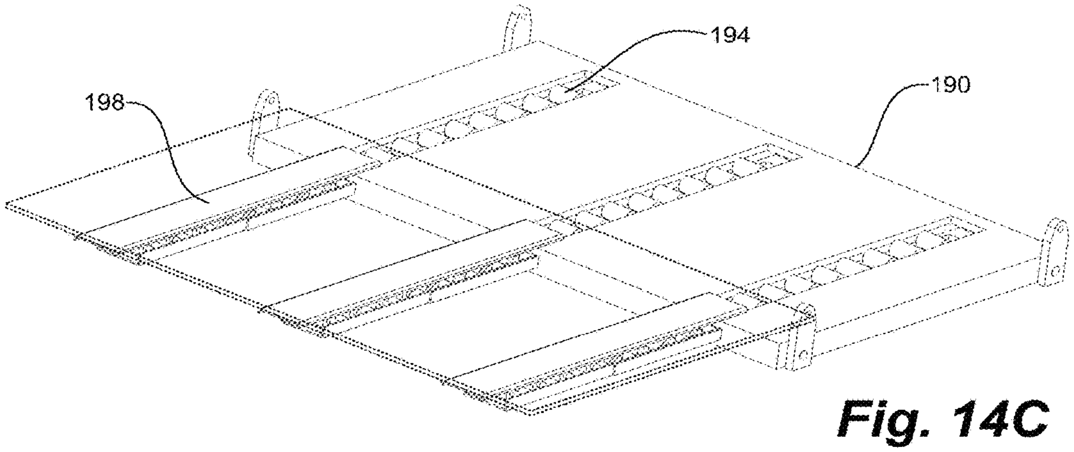
Figure 14D:
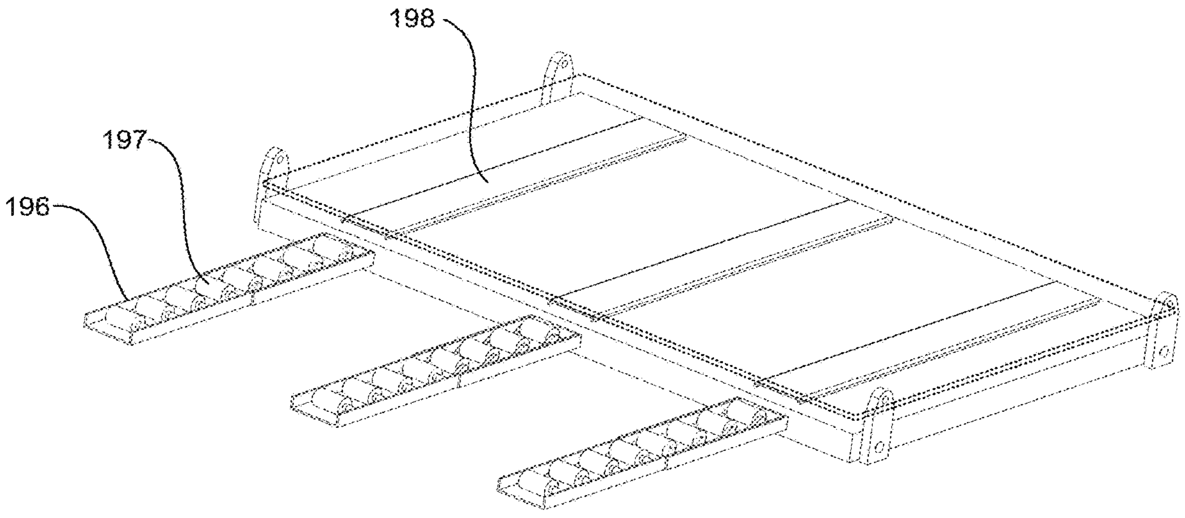
Figure 14E:
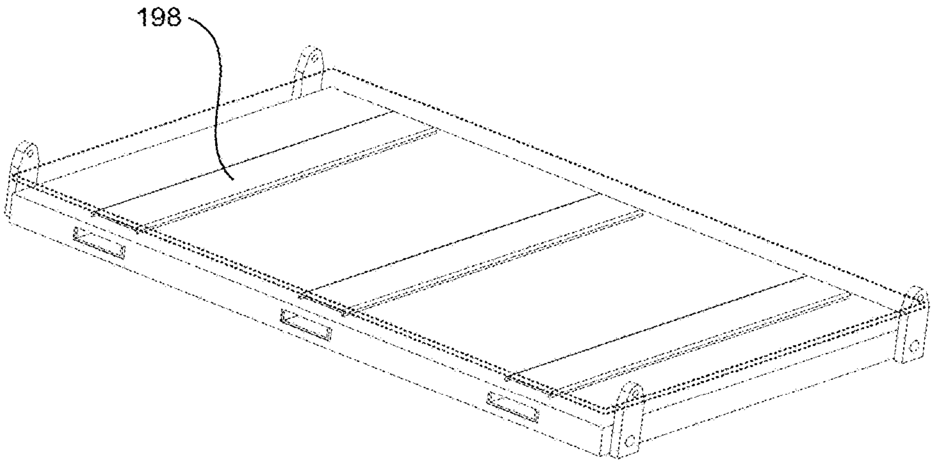

Referring to FIGS. 14A to 14E, the operation an embodiment of the transfer mechanism is illustrated. Referring to FIG. 14A, an embodiment of a crane platform 190 is depicted with three telescoping elements of the transfer mechanism in the retracted position. The crane platform 190 is located adjacent the targeted storage cell 141. Referring to FIG. 14B, telescoping bottom sliders 196 are extended from the crane platform 190 toward the targeted storage cell 141. The extended bottom sliders 196 are located in channels of a pallet under the selected load. Referring to FIG. 14C, telescoping top sliders 198 are extended from the crane platform 190 above the bottom sliders 196. A plurality of bottom slider rollers 197 in each bottom slider 196 and platform rollers 194 in the platform 190 are then actuated to a raised position, wherein the top slider 198 rests upon the bottom slider rollers 197 and contact the load. Referring to FIG. 14D, the top sliders 198 are retracted by the transfer drive mechanism, moving the pallet and the load resting thereon to the crane platform 190 by rolling over the rollers 194,197. Referring to FIGS. 14E and 15, the platform rollers 194 and bottom slider rollers 197 are lowered and the bottom sliders 196 are retracted. In embodiments, a retrieval mechanism is extended and engages a feature at the bottom of the pallet or a distal edge of the pallet to assist with transferring the pallet and load.

Referring to FIG. 16, in embodiments, the crane 184 performs a pre-lift loading of the cables of crane elevator drive mechanism. In embodiments, the loading crane platform locking mechanism is disengaged permitting vertical movement of the crane platform 190. In embodiments, wheels attached to the crane platform located in vertical channels of the structure continue to provide lateral support of the crane platform 190. During this time, in embodiments, a chassis locking mechanism fixes crane chassis 190 to the frame structure 102 and a crane locking mechanism fixes a crane 184 in the crane chassis. In embodiments, the crane platform 190 is lifted using multiple cables of the crane elevator drive mechanism.

Referring to FIG. 17, once crane platform 190 with the load including its pallet are lifted into the crane chassis 190, a seated crane platform locking mechanism is actuated to attach the crane platform 190 to the crane 184. In embodiments wherein the seated crane platform locking mechanism extends through apertures in the crane 184, the load is supported by the crane 184 through the seated crane platform locking mechanism.

Referring to FIG. 18, once seated crane platform locking mechanism is confirmed, the chassis locking mechanism permitting movement of the crane along the x-axis and the crane locking mechanism is released permitting movement of the crane along the y-axis. The load can then be transferred to the desired storage cell 141.

Referring to FIG. 19, shelves 140 are moved at the same time as the crane to create access to the targeted storage cell 141. Shelf locking mechanisms can be engaged and disengaged as appropriate.

Referring to FIG. 20, once the desired location along the x-axis and y-axis is obtained, the chassis locking mechanism and the crane locking mechanism are engaged to fix the horizontal location of the crane 184. Cables of the crane elevator drive mechanism are then preloaded. The seated crane locking mechanism is then released and the crane platform 190 is lowered with wheels located in channels within the adjacent shelves 140,160,170.

Once the crane platform is adjacent a destination storage cell 141, the loading crane platform locking mechanism is engaged to secure the crane platform to the adjacent shelves 140,160,170 and prevent movement thereof. In embodiments wherein the loading crane platform locking mechanism extends through apertures in the shelves 140,160,170, the load is supported by the shelves through the loading crane platform locking mechanism. In embodiments, the telescoping bottom sliders 196 are extended from the crane platform 190 toward the destination storage cell 141 and the plurality of bottom slider rollers 197 in each bottom slider 196 and platform rollers 194 in the platform 190 are then actuated to a raised position, wherein the top slider 198 rests upon the platform rollers 194 and contacts the load. In embodiments, the retrieval mechanism engages a feature at the bottom of the pallet or a distal edge of the pallet to assist with transferring the pallet and load. In embodiments, the top sliders 198 are extended by the transfer drive mechanism, moving the pallet and the load resting thereon to the destination storage cell 141 by rolling over the rollers 194,197. The platform rollers 194 and bottom slider rollers 197 are lowered and the bottom sliders 196, top sliders 198 and retrieval mechanism are retracted.

In embodiments, the crane platform 190 has the ability to transfer the load either side once it is locked to the shelves and ready to transfer. This allows the crane platform 190 to transfer loads to either end shelf 160,170 as well as have double sided shelves that move as one to reduce complexity and increase stability.

Although a few embodiments have been shown and described, it will be appreciated by those skilled in the art that various changes and modifications can be made to those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof.

The invention claimed is:

1. A storage and retrieval system for selectively storing and accessing loads, comprising:

a frame structure having a top, a bottom, a first side, a second side opposite the first side, a third side and a fourth side opposite the third side wherein the third side is adjacent the first side and the second side;

at least one shelf positioned within the frame structure, the at least one shelf comprising a plurality of storage cells on a first shelf side of the at least one shelf, wherein the at least one shelf is moveably attached to the frame structure and is moveable along a first horizontal axis;

at least one drive mechanism attached to the at least one shelf, the at least one drive mechanism configured to move the at least one shelf; and a crane adapted to move horizontally over the frame and comprising a crane platform configured to move vertically and adapted to transfer loads between the crane platform and the plurality of storage cells;

wherein the at least one shelf supports a portion of a weight of the crane.

2. The system of claim 1, wherein the at least one drive mechanism comprises at least a top drive mechanism located proximate the top of the frame structure and a bottom drive mechanism located proximate the bottom of the frame structure.

3. The system of claim 2, wherein the top drive mechanism and the bottom drive mechanism are mechanically linked.

4. The system of claim 1, wherein the at least one shelf comprises two or more shelves and wherein each of the two or more shelves support a portion of the weight of the crane.

5. The system of claim 1, wherein the at least one shelf is moveably attached to the frame structure via shelf rolling elements located at least proximate the top and the bottom of the frame structure.

6. The system of claim 1, wherein the system further comprises:

a first end shelf attached to the frame structure at the first side and comprising a plurality of first end storage cells; and a second end shelf attached to the frame structure at the second side and comprising a plurality of second end storage cells, wherein the at least one shelf further comprises a second plurality of storage cells on a second shelf side;

and wherein the first end shelf supports a second portion of the weight of the crane and the second end shelf supports a third portion of the weight of the crane.

7. The system of claim 1 further comprising:

a plurality of rails supported by the frame structure and running horizontally at the top of the frame structure;

a crane chassis moveably attached to two or more of the plurality of rails, the crane chassis comprising a crane chassis drive mechanism to move the crane chassis along the plurality of rails; and the crane moveably attached to the crane chassis, the crane configured to move horizontally along the crane chassis, the crane further comprising:

a crane drive mechanism to move the crane horizontally along the crane chassis, a crane platform, and a crane elevator drive mechanism to move the crane platform vertically relative to the crane.

8. The system of claim 7, wherein the at least one shelf further comprises one or more tracks running from the top to the bottom and the crane platform comprises one or more alignment elements adapted to engage the one or more tracks to limit non-vertical movement of the crane platform.

9. The system of claim 7, wherein the crane platform further comprises emergency crane platform locking elements configured to engage with the at least one shelf to lock the crane platform to the at least one shelf in the event of a failure of the crane elevator drive mechanism.

10. The system of claim 7, wherein the crane chassis further comprises crane chassis locking elements configured to engage with the frame structure to lock the crane chassis to the frame structure.

11. The system of claim 7, wherein the crane further comprises crane locking elements configured to engage with the crane chassis to lock the crane to the crane chassis.

12. The system of claim 7, wherein one of the crane and the crane platform further comprises seated crane platform locking elements that engage between the crane and crane platform to lock the crane platform to the crane during movement of the crane.

13. The system of claim 7, wherein the crane platform further comprises loading crane platform locking elements that engage with the at least one shelf to lock the crane platform to the at least one shelf during the transfer of loads between the crane platform and storage cells.

14. The system of claim 7, wherein:
- the crane platform defines two or more chambers, each chamber comprising a plurality of platform rollers; and
- a bottom slider configured to be extendable away from the crane platform and comprising a plurality of bottom slider rollers;
- wherein the platform rollers and bottom slider rollers are actuatable between a lowered position and a raised position.

15. The system of claim 14, wherein the crane platform further comprises a retrieval mechanism adapted to extend from crane platform to engage a feature on the loads for transferring the loads between the crane platform and storage cells.

16. A method of accessing a load in a storage and retrieval system, comprising:
- laterally moving storage shelves to create a corridor with access to a target load;
- moving a crane located above the storage shelves to a horizontal position directly above the corridor, wherein the storage shelves support a portion of a weight of the crane;
- lowering a crane platform from the crane to a vertical position adjacent the target load;
- transferring the target load to the crane platform; and
- raising the crane platform into the crane.

17. The method of claim 16, wherein:
- the step of lowering a crane platform from the crane to a vertical position adjacent the target load further comprises locking the crane platform to one or more of the storage shelves; and
- the step of transferring the target load to the crane platform further comprises unlocking the crane platform from the one or more of the storage shelves after the load has been transferred to the crane platform.

18. A method of storing a load in a storage and retrieval system, comprising:
- laterally moving storage shelves to create a corridor with access to a target storage cell;
- moving a crane located above the storage shelves, the crane comprising a crane platform having the load thereon to a horizontal position directly above the corridor, wherein the storage shelves support a portion of a weight of the crane;
- lowering the crane platform from the crane to a vertical position adjacent the target location; and
- transferring the load from the crane platform to the target storage cell.

19. The method of claim 18, wherein:
- the step of lowering the crane platform from the crane to a vertical position adjacent the target storage cell further comprises locking the crane platform to one or more of the storage shelves;
- the step of transferring the load from the crane platform to the target storage cell further comprises unlocking the crane platform from the one or more of the storage shelves after the load has been transferred to the target storage cell; and
- the method further comprises the step of raising the crane platform into the crane.

20. The method of claim 16, wherein moving the crane comprises moving a crane chassis along a first horizontal axis and moving the crane moveable within the crane chassis along a second horizontal axis perpendicular to the first horizontal axis.

* * * * *